(12) United States Patent
Taniyama et al.

(10) Patent No.: US 11,736,644 B2
(45) Date of Patent: *Aug. 22, 2023

(54) IMAGE READING APPARATUS, IMAGE READING CONTROL METHOD AND NON-TRANSITORY COMPUTER-READABLE STORAGE MEDIUM STORING PROGRAM

(71) Applicant: Seiko Epson Corporation, Tokyo (JP)

(72) Inventors: Ryoichi Taniyama, Kitakyushu (JP); Rei Tsutsui, Kitakyushu (JP); Yoshihiro Hamaguchi, Kitakyushu (JP); Yuji Takase, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,145

(22) Filed: Feb. 7, 2022

(65) Prior Publication Data

US 2022/0159131 A1 May 19, 2022

Related U.S. Application Data

(63) Continuation of application No. 17/188,678, filed on Mar. 1, 2021, now Pat. No. 11,399,109.

(30) Foreign Application Priority Data

Mar. 3, 2020 (JP) .................................. 2020-035536

(51) Int. Cl.
*G06F 3/12* (2006.01)
*H04N 1/00* (2006.01)

(52) U.S. Cl.
CPC ....... *H04N 1/0092* (2013.01); *H04N 1/00708* (2013.01); *H04N 1/00806* (2013.01); *H04N 1/00824* (2013.01)

(58) Field of Classification Search
CPC ............. H04N 1/0092; H04N 1/00708; H04N 1/00806; H04N 1/00822; H04N 1/00824
See application file for complete search history.

(56) References Cited

U.S. PATENT DOCUMENTS

| | | | |
|---|---|---|---|
| 2007/0168387 A1* | 7/2007 | Matoba | H04N 1/0035 |
| 2007/0183002 A1 | 8/2007 | Corona | |
| 2010/0149577 A1* | 6/2010 | Kamasuka | H04N 1/33369 358/1.15 |

FOREIGN PATENT DOCUMENTS

JP 2005-102249 4/2005

* cited by examiner

*Primary Examiner* — Moustapha Diaby
(74) *Attorney, Agent, or Firm* — Workman Nydegger

(57) ABSTRACT

Setting conditions related to reading of an image of a document are registered in association with a user according to input by a user. When a user is identified, the priority order is determined so that a setting condition corresponding to the identified user is prioritized over a setting condition not corresponding to the user among the registered setting conditions, and the setting condition information indicating the setting conditions in the determined priority is displayed. The image is read under the setting condition based on the setting condition information selected according to the input by the user of the setting condition information indicating the displayed setting conditions.

11 Claims, 9 Drawing Sheets

FIG. 4

| USER ID | PASSWORD | USER NAME | DISPLAY COLOR | DISPLAY ORDER |
|---|---|---|---|---|
| USER UA | PASSWORD PA | NAME UNA | DISPLAY COLOR CLA | DISPLAY ORDER OA |
| USER UB | PASSWORD PB | NAME UNB | DISPLAY COLOR CLB | DISPLAY ORDER OB |
| ... | ... | ... | ... | ... |

UDB

FIG. 5

| REGISTRATION JOB ID | REGISTRATION TIME | REGISTRATION NAME | USER ID | PRIORITY DISPLAY FLAG | JOB CONTENTS | USAGE HISTORY |
|---|---|---|---|---|---|---|
| JOB JA1 | TIME TA1 | NAME NA1 | USER UA | VALID | CONTENTS CA1 | HISTORY RA1 |
| JOB JA2 | TIME TA2 | NAME NA2 | USER UA | INVALID | CONTENTS CA2 | HISTORY RA2 |
| JOB JB1 | TIME TB1 | NAME NB1 | USER UB | VALID | CONTENTS CB1 | HISTORY RB1 |
| JOB JB2 | TIME TB2 | NAME NB2 | USER UB | INVALID | CONTENTS CB2 | HISTORY RB2 |
| ... | ... | ... | ... | ... | ... | ... |

JDB

IMAGE READING APPARATUS, IMAGE READING CONTROL METHOD AND NON-TRANSITORY COMPUTER-READABLE STORAGE MEDIUM STORING PROGRAM The present application is a continuation of U.S. application Ser. No. 17/188,678, filed Mar. 1, 2021, which claims priority to JP Application No. 2020-035536, filed Mar. 3, 2020, the disclosures of which are hereby incorporated by reference herein in their entireties.

BACKGROUND

1. Technical Field

The present disclosure relates to an image reading apparatus that reads an image from a document, an image reading control method, and a non-transitory computer-readable storage medium storing a program.

2. Related Art

For example, JP-A-2005-102249 discloses an image reading apparatus including a reading unit that reads an image from a document. In such an image reading apparatus, a plurality of setting conditions related to reading of an image can be registered by the user. A plurality of icons (setting condition information) indicating the registered setting conditions is displayed in a predetermined display area, and when any of the plurality of icons displayed is selected by the user, the image is read based on the setting condition corresponding to the selected icon.

However, in the image reading apparatus described in JP-A-2005-102249, for example, when the number of setting conditions to be registered increases due to the setting conditions being registered by a plurality of users, the setting condition information indicating the setting condition desired by the user may not be displayed in the predetermined display area. In this case, the setting condition information indicating the setting condition desired by the user according to the operation of the user have to be selected after displayed in a predetermined display area. Therefore, it is desired to improve the convenience of the user to select any of the registered setting conditions.

SUMMARY

According to an aspect of the present disclosure, an image reading apparatus includes a reading unit that reads an image from a document, a controller that controls the reading unit, and a display unit that displays information about the image reading by the reading unit, wherein the controller includes a registration unit that registers, according to input by a user, a setting condition related to the image reading by the reading unit in association with the user, an identification unit that identifies the user, a determination unit that determines a priority order so that a setting condition corresponding to the user is prioritized over a setting condition not corresponding to the user among setting conditions registered by the registration unit when the user is identified by the identification unit, a display controller that displays, on the display unit, setting condition information indicating the setting conditions in the priority order determined by the determination unit, and a reading controller that causes the reading unit to read an image under a setting condition based on setting condition information selected according to input by a user of the setting condition information indicating the setting conditions displayed on the display unit.

According to another aspect of the present disclosure, an image reading control method includes a registration step of registering, according to input by a user, a setting condition related to reading of an image from a document in association with the user, an identification step of identifying a user, a determination step of determining a priority order so that when a user is identified in the identification step, a setting condition corresponding to the user is prioritized over a setting condition not corresponding to the user among setting conditions registered in the registration step, a display control step of displaying, on the display unit, setting condition information indicating the setting conditions in the priority order determined in the determination step, and a reading control step of causing the reading unit to read an image under a setting condition based on setting condition information selected according to input by a user of the setting condition information indicating the setting conditions displayed in the display control step.

According to still another aspect of the present disclosure, a non-transitory computer-readable storage medium storing a program causes a computer to execute a method. The method includes a registration step of registering, according to input by a user, a setting condition related to reading of an image from a document in association with the user, an identification step of identifying a user, a determination step of determining a priority order so that when a user is identified in the identification step, a setting condition corresponding to the user is prioritized over a setting condition not corresponding to the user among setting conditions registered in the registration step, a display control step of displaying, on the display unit, setting condition information indicating the setting conditions in the priority order determined in the determination step, and a reading control step of causing the reading unit to read an image under a setting condition based on setting condition information selected according to input by a user of the setting condition information indicating the setting conditions displayed in the display control step.

BRIEF DESCRIPTION OF THE DRAWINGS

FIG. 4 is a schematic diagram showing a user database.

FIG. 5 is a schematic diagram showing a registration job database.

DESCRIPTION OF EXEMPLARY EMBODIMENTS

First Embodiment

Figure 1:
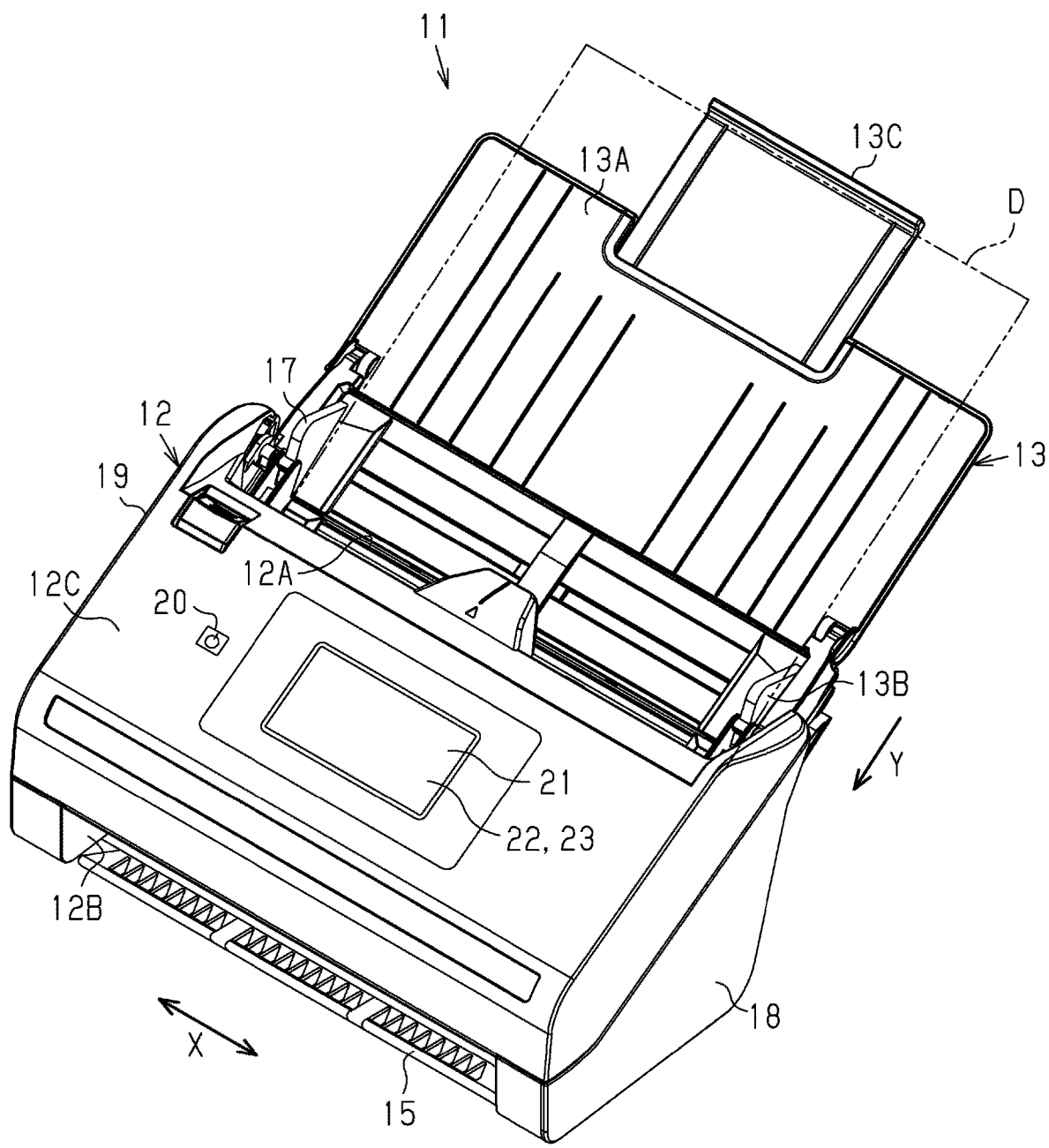
FIG. 1 is a perspective view of an image reading apparatus according to the first embodiment.

Hereinafter, the first embodiment of an image reading apparatus will be described with reference to the drawings. As shown in FIG. 1, an image reading apparatus 11 of the present embodiment includes a main body 12 having a substantially trapezoidal shape in side view, and a document support 13 on which a document D to be image-read is placed (set). A stacker 15 is housed in the main body 12 under a discharge port 12B so as to be slidable in the front/rear direction.

The document support 13 has a flat placement face 13A on which a plurality of documents D can be placed by extending diagonally upward from the rear of the main body 12. The document support 13 is provided with a pair of edge guides 13B that can slide in a width direction X that intersects (particularly orthogonally) with a transport direction Y in which the document D is transported. The document D placed on the placement face 13A is positioned in the width direction X with respect to a feed port 12A by being held between the pair of edge guides 13B. Further, a slide-type auxiliary support portion 13C is provided on the placement face 13A of the document support 13 so as to be able to move in and out. The document D placed on the placement face 13A is positioned in the transport direction Y with respect to the feed port 12A by coming into contact with the slide-type auxiliary support portion 13C. The width direction X is the main scanning direction when the image reading apparatus 11 reads an image of the document D, and the transport direction Y is the sub scanning direction.

The document D placed on the document support 13 is fed one by one from the feed port 12A opened at the upper part of the main body 12 into the main body 12. The fed document D is transported in the main body 12 along a predetermined transport path 29 (see FIG. 2), and is discharged from the discharge port 12B opened at the lower front of the main body 12 after its image is read in a reading region SA during the transport.

A power button 20 is provided on a front face portion 12C of the main body 12. The front face portion 12C of the main body 12 is provided with a display unit 22 such as a liquid crystal panel for displaying a predetermined image in a display area 23. The display unit 22 is configured to display information about the image reading apparatus 11. The display unit 22 is provided with an input unit 21, such as a touch panel, that can detect a user's touch operation. The input unit 21 is configured to input necessary information according to a user's touch operation when giving an instruction to the image reading apparatus 11.

Figure 2:
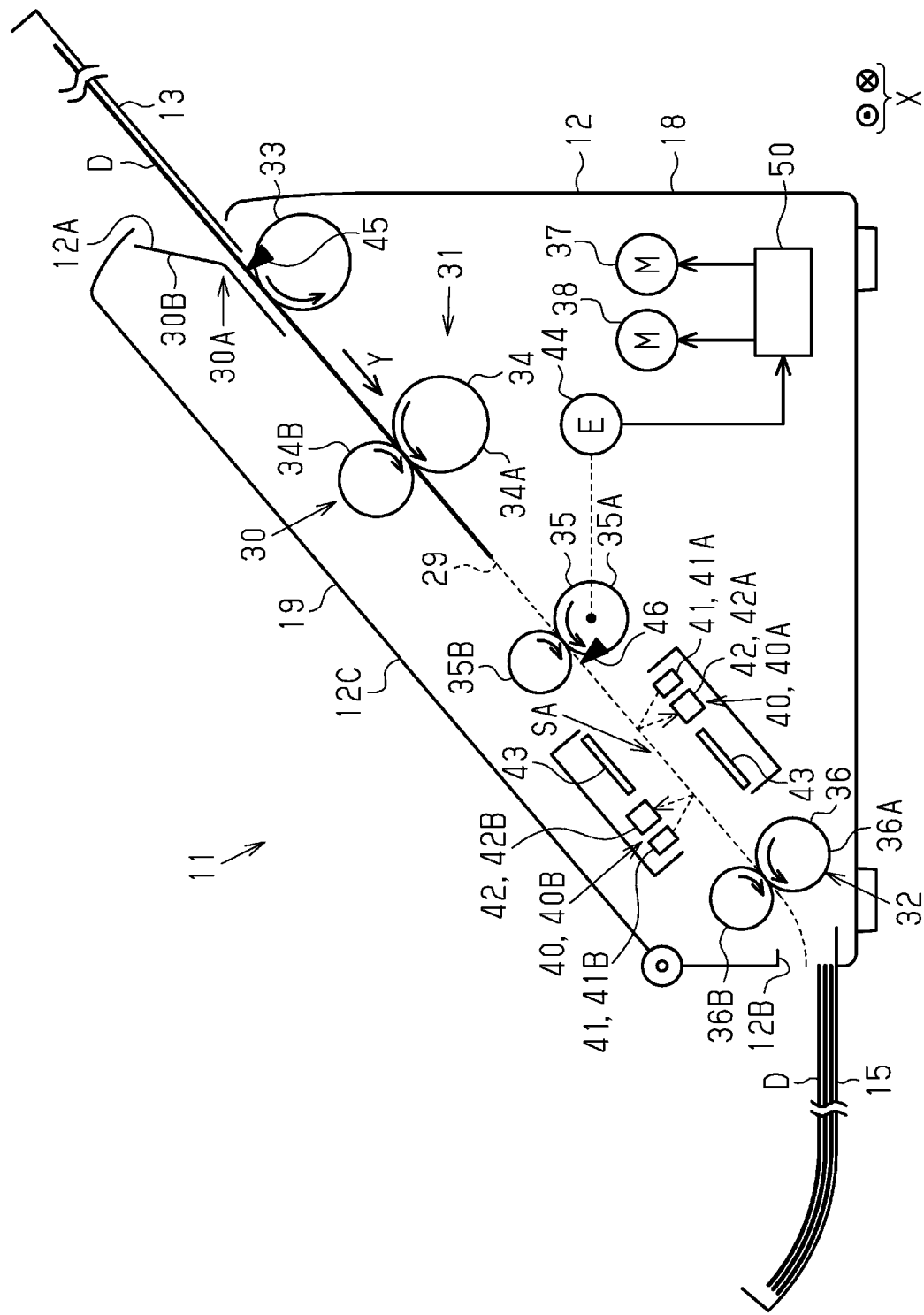
FIG. 2 is a schematic side sectional view of an image reading apparatus.

As shown in FIG. 2, the main body 12 includes a main body portion 18 and a cover portion 19 rotatably coupled around a front end portion of the main body portion 18. The main body 12 has the transport path 29 (transport passage) extending from the feed port 12A to the discharge port 12B between the main body portion 18 and the cover portion 19.

A transport mechanism 30 that transports the document D is provided in the main body 12. The transport mechanism 30 includes a feeding unit 30A that feeds the documents D placed (set) on the document support 13 one by one while guiding them into the main body 12, a transport unit 31 that transports the fed document D along the transport path 29 so that the fed document D passes through the reading region SA, and a discharge unit 32 that discharges the document D after the image is read by the transport unit 31 during the transport. The transport mechanism 30 has an automatic document feed function that sequentially transports a plurality of documents D placed on the document support 13 one by one along the transport path 29 so that they pass through the reading region SA.

The feeding unit 30A includes one feed roller 33 (pickup roller) facing a feed guide 30B at the upstream end position of the transport path 29 in the main body 12. The feeding unit 30A feeds the plurality of documents D placed on the document support 13 one by one from the feed port 12A along the feed guide 30B.

The transport unit 31 includes a pair of feed rollers 34 disposed at a position downstream of the feed roller 33 in the transport direction Y and a pair of transport rollers 35 disposed at a position upstream of the reading region SA in the transport direction Y. The pair of feed rollers 34 is composed of a drive roller 34A and a separation roller 34B (retard roller). The pair of transport rollers 35 is composed of a drive roller 35A and a driven roller 35B.

The discharge unit 32 includes a pair of discharge rollers 36 disposed at a position downstream of the reading region SA in the transport direction Y. The pair of discharge rollers 36 is composed of a drive roller 36A and a driven roller 36B. The pair of discharge rollers 36, together with the pair of transport rollers 35, is also responsible fir transporting the document D during reading.

In this way, the feed roller 33, the pair of feed rollers 34, the pair of transport rollers 35, and the pair of discharge rollers 36 are disposed in order from upstream in the transport direction Y, and are disposed at intervals in the width direction X.

The plurality of rollers 33, 34A of the feed system is rotationally driven by the power of a feed motor 37, which is the power source for them. The plurality of documents D placed on the document support 13 is fed by the feed roller 33 from the feed port 12A into the main body 12 one by one in order from the lowest document. In this way, the feeding unit 30A (the rollers 33, 34A, and the like) is driven by the feed motor 37 as a power source.

Further, the separation roller 34B of the feed system and the drive rollers 35A and 36A of the transport system are rotationally driven by the power of a transport motor 38 which is the power source thereof. The document D fed into the main body 12 by the feed roller 33 is transported to the reading region SA and then discharged from the discharge port 12B. In this way, the transport unit 31 (the pair of transport rollers 34, and the like) and the discharge unit 32 (the pair of discharge rollers 36, and the like) are driven by the transport motor 38 as a common power source.

Further, the drive rollers 35A and 36A are rotationally driven so as to transport the document D at the same transport speed (reading speed) when the document D is read. The driven rollers 35B and 36B are rotated by the rotation of the drive rollers 35A and 36A, which are paired with the driven rollers 35B and 36B, respectively.

Further, an encoder 44 (for example, a rotary encoder) capable of detecting the rotation of one drive roller of the transport system among the plurality of roller pairs 34 to 36 is provided in the main body 12. The encoder 44 outputs, to a controller 50, a detection signal including pulses whose number is proportional to the amount of rotation of the drive roller. Therefore, the controller 50 can grasp the position (transport position) of the document D being transported and the transport speed in the controller 50 based on the detection signal of the encoder 44.

Further, a document sensor 45 that detects the presence/absence of the document D set on the document support 13 is disposed between the pair of feed rollers 33. The document sensor 45 is, for example, a contact sensor having a lever. When the document D is set on the document support 13, the document sensor 45 is turned on when the set document D pushes the lever.

Further, a document presence/absence sensor 46 capable of detecting the presence/absence of the document D is disposed at a position slightly downstream of the nip point of the pair of transport rollers 35 in the transport direction Y. The document presence/absence sensor 46 is, for example, a contact sensor having a lever (contactor). The document presence/absence sensor 46 detects the document D when the front end of the document D pushes the lever and is turned on, and when the rear end of the document D passes by and the lever is not pushed, the document presence/absence sensor 46 does not detect the document D and is turned off. Therefore, based on the detection signal (ON/OFF) of the document presence/absence sensor 46, the controller 50 detects that the front end of the document D has passed through the pair of transport rollers 35 and the rear end of the document D has passed through the pair of transport rollers 35. The detection result by the document presence/absence sensor 46 detecting the front end and the rear end of the document D is used for determining the start timing and the end timing of the reading operation of a reading unit 40 (40A, 40B) described later. Further, since the document presence/absence sensor 46 can detect the front end and the rear end of the document D, it is also possible to detect the length of the document D in the transport direction Y, that is, the document size determined from the length based on the transport distance of the document D from when the front end of the document D is detected to when the rear end is detected. The document presence/absence sensor 46 may be a non-contact sensor such as an optical sensor.

The reading unit 40 that reads an image is provided in the main body 12 of the image reading apparatus 11. The pair of reading units 40 is provided on both sides of the transport path 29 at a position between the pair of transport rollers 35 and the pair of discharge rollers 36 in the transport direction Y. In the embodiment the pair of reading units 40 includes a first reading unit 40A that reads the front face (lower face) of the document D transported along the transport path 29, and a second reading unit 40B that reads the back face (upper face) of the document D transported along the transport path 29. Although they are located slightly offset from each other in the transport direction Y, the configuration may not include one of the reading units.

The pair of reading units 40 includes a light source 41 capable of irradiating the document D being transported with light by irradiating the reading region SA with light, and an image sensor 42 capable of reading an image from the document D. In the normal reading mode, only the first reading unit 40A performs the reading operation to read the front face of the document D, and in the double-sided read mode, both the first reading unit 40A and the second reading unit 40B perform the reading operation to read both sides (front face and back face) of the document D.

The light source 41 is composed of, for example, an LED, a fluorescent lamp, or the like. The image sensor 42 receives the reflected light when the light emitted from the light source 41 is reflected by the document D to convert the received light into an electric signal to output a pixel signal having a value corresponding to the amount of received light. In this way, the image sensor 42 is a sensor that reads an image. The image sensor 42 is, for example, a linear image sensor. The image reading apparatus 11 is capable of performing color scanning and monochrome scanning (grayscale scanning). In the following, the light source 41 and the image sensor 42 may be referred to as a first light source 41A and a first image sensor 42A for the first reading unit 40A, and may be referred to as a second light source 41B and a second image sensor 42B for the second reading unit 40B.

The image sensor 42 is, for example, a contact type image sensor in which a plurality of photoelectric conversion elements is disposed in a row along a main scanning direction X. Further, the image sensor 42 is specifically a complementary metal oxide semiconductor (CMOS) image sensor. The image sensor 42 photoelectrically converts the light received by each photoelectric conversion element to output a pixel signal having a value corresponding to the amount of received light.

Further, a color reference plate 43 is disposed so as to face the image sensor 42 with the transport path 29 disposed therebetween. The color reference plate 43 is disposed in a region that includes the region of the document D and is wider than the region of the document D in the region to be read by the reading unit 40. Therefore, the color reference plate 43 is a member that makes it possible to grasp whether the image read by the reading unit 40 is the region of the document D. That is, the color reference plate 43 is a background plate that can be read as the background of the document D. Further, the color reference plate 43 is a member for obtaining a white reference value for shading correction, and a white reference plate exhibiting white or a gray reference plate exhibiting gray is used as the color reference plate 43. As a result, the color reference plate 43 is read as a white reference image, and the white reference value is generated based on the read white reference image. In the case of a gray reference plate, the color reference plate 43 is read as the background (gray background) of the document and used for detecting the position and region of the document D. When a sensor that detects the document region is separately provided, the color reference plate 43 is preferably a white reference plate. Further, the color reference plate 43 is not limited to have the plate shape, and may have any shape and color as long as it is a reference member for obtaining a white reference value that is a reference for luminance.

The image reading apparatus 11 includes the controller 50. The controller 50 controls the image reading apparatus 11 when a job to read an image from document D is input based on an operation signal from the input unit 21 (see FIG. 1) operated by the user or a read instruction signal (read instruction) from a host device 100 described later. When performing reading control, the controller 50 controls the feed motor 37, the transport motor 38, and the reading unit 40 (40A, 40B) to process image data based on the image read from the document D by the reading unit 40.

Figure 3:
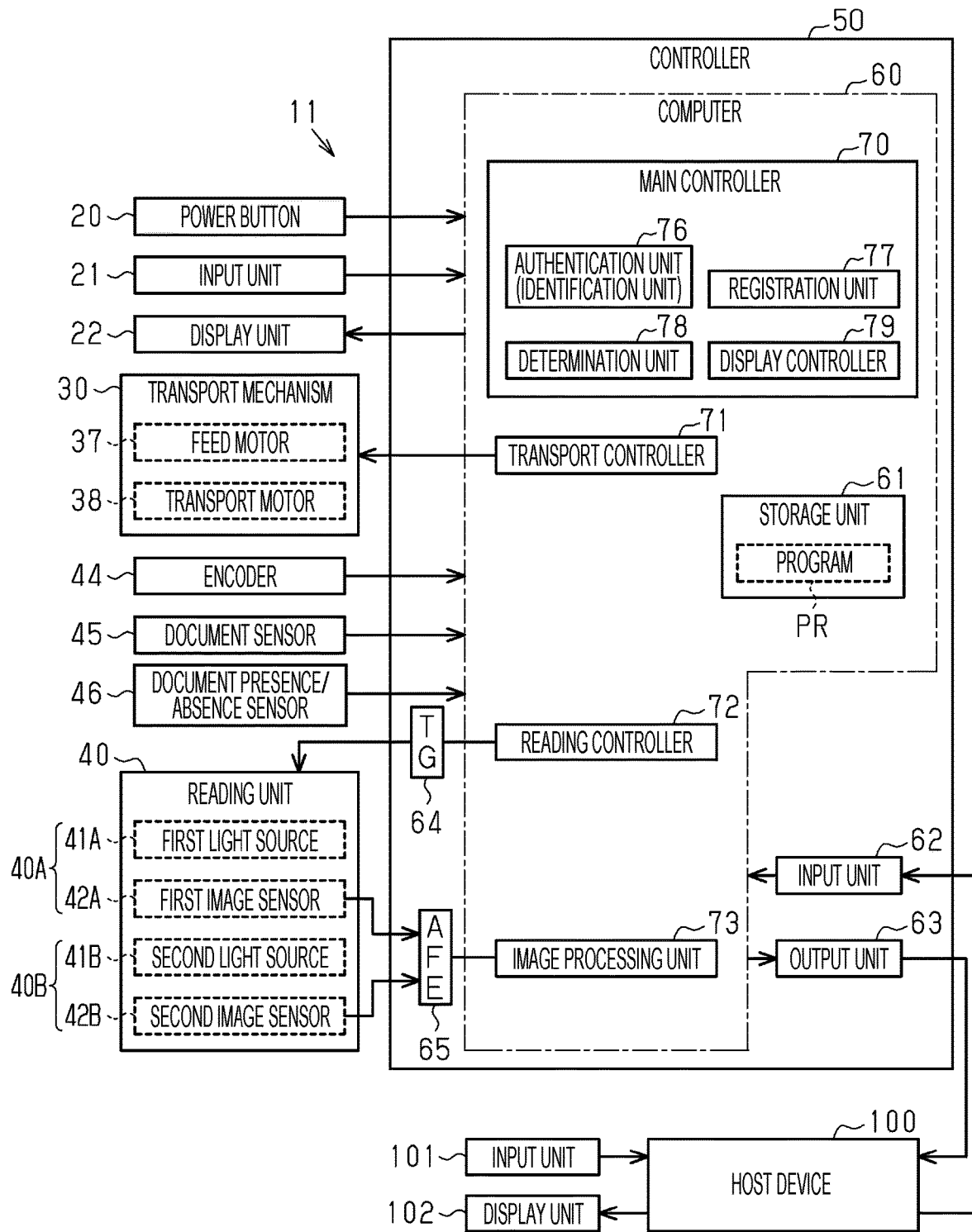
FIG. 3 is a block diagram showing an electrical configuration of the image reading apparatus.

Next, the electrical configuration of the image reading apparatus 11 will be described with reference to FIG. 3. As shown in FIG. 3, the image reading apparatus 11 is coupled to the host device 100 through a communication cable. The host device 100 is, for example, a personal computer (hereinafter, also referred to as a "PC"), and includes an input unit 101 and a display unit 102 that are electrically coupled to the main body of the personal computer. The host device 100 includes a reading driver including software having a function of giving a reading instruction to the image reading apparatus 11 by installing a reading driver program. The host device 100 is not limited to a PC, but may be a mobile information terminal (PDA (Personal Digital Assistants)), a tablet PC, a smart device such as a smartphone, or the like.

When the user operates the input unit 21 or the input unit 101 of the host device 100, the setting conditions related to the image reading process are set. That is, the setting conditions are set by the input by the user. The setting conditions include reading conditions including a document size, a reading resolution, a reading color, a single-sided reading/a double-sided reading, and the like, and storage conditions including a read data (image data) storage format, a transfer method, and a storage destination. The document size includes, for example, A4 size and B5 size, the reading resolution includes, for example, 300 dpi/600 dpi, and the reading color includes monochrome (gray scale)/color. The storage format includes a PDF format, a PDF/A format, a JPEG format, a GIF format, a TIFF format and the like. Further, the transfer method includes transferring to the host device 100 and mail transferring, and the address of the storage destination is specified as the storage destination.

The image reading apparatus 11 has a built-in controller 50 that controls the image reading apparatus 11 in an integrated manner. The controller 50 includes a computer 60 including a microprocessor or the like. The computer 60 includes a storage unit 61 (memory) including a RAM, a nonvolatile memory, and the like. The storage unit 61 stores a program PR or the like to be executed during read control.

Further, the controller 50 includes an input unit 62 including an input interface for inputting various pieces of data and signals from the host device 100, and an output unit 63 including an output interface for outputting the read data read by the image reading apparatus 11 to the host device 100.

Further, the controller 50 includes a timing generator 64 (hereinafter, also referred to as a "TG64") that outputs a pulse signal that defines various operation timings including a reading operation to the image sensors 42A and 42B. Further, the controller 50 includes an analog front end 65 (hereinafter, also referred to as an "AFE65") that performs analog/digital conversion (A/D conversion) of a pixel signal input from the image sensors 42A and 42B.

Figure 6:
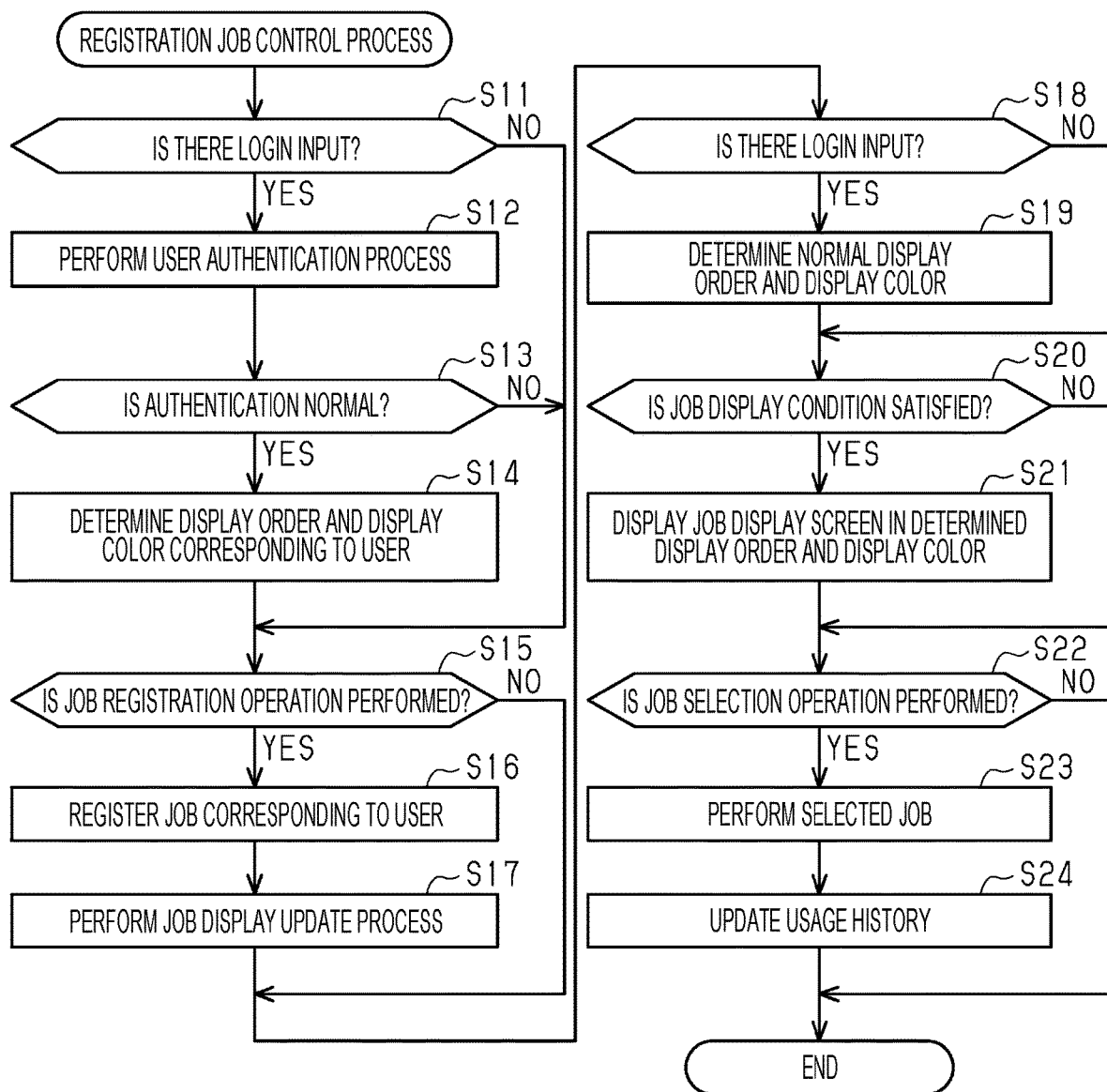
FIG. 6 is a flowchart showing a registration job control process.

The storage unit 61 stores the program PR including the registration job control process shown in the flowchart of FIG. 6. Further, the storage unit 61 stores the setting conditions by the input by the user. The computer 60 includes a main controller 70, a transport controller 71, a reading controller 72, and an image processing unit 73 as functional parts composed of software internally configured by executing the program PR. The main controller 70 comprehensively controls the image reading apparatus 11.

The transport controller 71 drives and controls the feed motor 37 and the transport motor 38 according to the instruction from the main controller 70. When the feed roller 33 is rotated by driving the feed motor 37, a plurality of documents D set in the document support 13 is fed into the main body 12 one by one in order from the lowest document.

Further, when the feed motor 37 is driven, the one drive roller 34A constituting the pair of feed rollers 34 is rotationally driven, and when the transport motor 38 is driven, the other separation roller 34B is rotationally driven. In particular, the transport controller 71 drives and controls the feed motor 37 and the transport motor 38 so that the document D is transported at a reading speed corresponding to the reading resolution (for example, 300/600 dpi) in the reading region SA in the middle of the transport path 29. For example, when the reading resolution is relatively low (for example, 300 dpi), the document D is transported at a high speed, and when the reading resolution is relatively high (for example, 600 dpi), the document D is transported at a low speed.

The reading controller 72 controls the reading unit 40 through the TG 64, and causes the reading unit 40 to read the image of the document D. In particular, the reading controller 72 outputs a pulse signal to the TG64 that defines the operation timing of various operations including the reading operation to the image sensor 42 to control the light emission of the light source 41 via a light source drive unit (not shown) to irradiate the reading region SA with light from the light source 41.

When the digital signal of the image read by the reading unit 40 is input via the AFE 65, the image processing unit 73 temporarily stores image data based on the input digital signal to perform a known correction process such as a shading correction on the stored image data to generate image data of the document D. The image processing unit 73 performs various corrections such as a gamma correction in addition to the shading correction to output the corrected image data to the host device 100 via a communication cable (not shown) through the output unit 63.

In the embodiment, a setting condition is selected according to input by the user, and then, the image is read under the setting condition corresponding to the selection result according to input by the user. The image reading apparatus 11 has a pre-registration function (so-called a "favorite job registration function") of pre-registering the setting conditions. The display unit 22 can display job icons (for example, indicated by reference numerals 90B to 90E in FIG. 7) as an example of the setting condition information indicating the setting conditions registered in advance, and when the displayed job icon is selected and input from the input unit 21, the image is read based on the setting condition corresponding to the selected job icon.

In this way, normally, it is necessary to perform input for reading the image after input for selecting the setting condition is performed every time the image is read, but when the setting condition is registered in advance, the image can be read based on the pre-registered setting condition simply by selecting the job icon indicating the setting condition registered in advance. In particular, when it is necessary to select a plurality of setting conditions (for example, a document size and a resolution), once a combination of the plurality of setting conditions is registered in advance, the image can be read based on the combination of the plurality of pre-registered setting conditions simply by selecting the job icon that indicating the combination of the plurality of setting conditions.

Further, in the present embodiment, the image reading apparatus 11 has an authentication function of authenticating the user. When the user is authenticated, the job icon to be displayed preferentially to the display unit 22 can be made to be different according to the authenticated user. In the present embodiment, up to a predetermined number of (for example, 4) job icons can be displayed in the display area 23 of the display unit 22, while the number of setting conditions exceeding the predetermined number can be registered. For this reason, in the related art, there is no problem when a job icon displayed in the display area 23 of the display unit 22 can be selected, but when a job icon that is not displayed in the display area 23 of the display unit 22 is to be selected, it is necessary to find the job icon that the user desires, for example, by performing input such as display switching. Therefore, in the embodiment, in such a case, the job icon to be displayed preferentially to the display unit 22 can be made to be different according to the authenticated user, so that it is possible to provide a situation in which the user can easily select the desired job icon.

As shown in FIG. 3, the main controller 70 includes an authentication unit 76, a registration unit 77, a determination unit 78, and a display controller 79. In other words, the controller 50 includes the authentication unit 76, the registration unit 77, the determination unit 78, and the display controller 79. In the present embodiment, the authentication unit 76 compares the user ID and the password input from the input unit 21 with the user ID and the password stored in the storage unit 61 to authenticate the user, but the present disclosure is not limited to this. For example, the authentication unit 76 may read the user ID and the password from a medium (for example, an ID card) from which the user ID can be read to compare them with the user ID and the password stored in the storage unit 61 to authenticate the user. That is, the authentication unit 76 may authenticate the user according to any method. In addition, such an authentication unit 76 also functions as an identification unit that can identify the user.

The registration unit 77 registers the setting condition in advance according to the input by the user. Specific examples of the setting condition include A4 size as the read document size, 600 dpi as the reading resolution, monochrome as the reading color, a PDF format as the storage format, and transferring to the host device 100 as the transfer method, and not only one type of setting condition but also a combination of a plurality of types of setting conditions is included.

Further, as shown in FIG. 4, in the present embodiment, the storage unit 61 stores a user database UDB. In the user database UDB, a user ID, a password, a user name, a display color, and a display order are associated with each other. The user database UDB is updated according to the input by the user.

The user ID is information that makes the user identifiable, the password is a password used when authenticating the user, and the user name is a name of the user to be displayed on the display unit 22.

The display color is a user-specific color to be displayed on the display unit 22, and the image is displayed in the set display color. To give a specific example, when "blue" is set as a display color CLA corresponding to the user UA, part of the image of the display area 23 of the display unit 22 is displayed in blue.

The display order is information for determining the priority order of the job icons to be displayed on the display unit 22 among the setting conditions corresponding to the authenticated user. Specific examples include an ascending order, or a descending order of registration time in which setting conditions are registered, an order of types of setting conditions (job contents), an ascending order, or a descending order of job icon names (alphanumeric and alphanumeric characters, and the like), an order of the usage history, which is a history of the number of times the job icon is used (selected), and the like.

In this way, the user is authenticated by referring to the user database UDB. Then, when the user is authenticated, the display color and the display order corresponding to the authenticated user can be identified by referring to the user database UDB.

Further, as shown in FIG. 5, in the present embodiment, the storage unit 61 stores a registration job database JDB. In the registration job database JDB, a registration job ID, a registration time, a registration name, a user ID, a priority display flag, job contents, and a usage history as an example of history information are associated with each other. The registration job database JDB is updated according to the input by the user.

The registration job ID is information unique to the registered setting condition, the registration time is information indicating the time (year, month, day and time) when the setting condition was registered, and the registration name is a name registered as the setting condition (job icon) to be displayed on the display unit 22.

The user ID is a user ID indicating the user corresponding to the registration job. That is, the registration unit 77 registers the setting condition so as to correspond to the user. The priority display flag is information indicating whether the setting condition is a setting condition to be displayed with the highest priority among the setting conditions corresponding to the authenticated user when the user is authenticated. The job contents are information indicating the contents of one type of setting condition or the contents of a combination of a plurality of types of setting conditions. The usage history is history information indicating the number of times the registered setting condition is used.

In this way, when the user is authenticated, it is possible to identify whether the setting condition is a setting condition corresponding to the authenticated user, whether the setting condition is a setting condition to be displayed with the highest priority among the setting conditions corresponding to the authenticated user, the contents of the setting condition, and the usage history by referring to the registration job database JDB. That is, the registration unit 77 registers the setting condition in association with the user according to the input by the user.

The determination unit 78 determines the priority order of the setting conditions to be displayed as the job icons on the display unit 22 from the setting conditions registered by the registration unit 77. In particular, when the user is authenticated by the authentication unit 76, the determination unit 78 refers to the registration job database JDB to determine the priority order so that a setting condition corresponding to the authenticated user is prioritized over a setting condition not corresponding to the user. Further, when the user is authenticated by the authentication unit 76, the determination unit 78 refers to the registration job database JDB to determine the priority order so that a setting condition that the priority display flag is set is prioritized over a setting condition that the priority display flag is not set among the setting conditions corresponding to the authenticated user.

The display controller 79 controls the image to be displayed on the display unit 22. In particular, the display controller 79 displays the job icon corresponding to the setting condition determined by the determination unit 78. That is, the display controller 79 can make the job icon to be displayed with priority different according to the authenticated user.

Next, the registration job control process performed by the computer 60 will be described with reference to the flowchart shown in FIG. 6. The registration job control process is a process performed at a predetermined cycle.

As shown in FIG. 6, in step S11, the controller 50 determines whether there is a login input according to the input from the input unit 21. In this process, when the controller 50 determines that there is no login input, the controller 50 advances the process to step S15 without executing steps S12 to S14. On the other hand, when the controller 50 determines that there is the login input, the controller 50 advances the process to step S12.

In step S12, the controller 50 performs the user authentication process. In this process, the controller 50 acquires the user ID and the password corresponding to the input from the input unit 21. The controller 50 refers to the user database UDB, authenticates the user by determining whether the information that the entered user ID and password match is in the user database UDB, and advances the process to step S13. In the embodiment, step S12 corresponds to an example of an identification step (authentication step).

In step S13, the controller 50 determines whether the authentication is normal based on the result of the user authentication performed in step S12. When the controller 50 determines that the information that the entered user ID and the password match is in the user database UDB, the controller 50 determines that the user authentication is performed normally. When the controller 50 determines that the authentication is not normal, the controller 50 advances the process to step S15 without executing step S14. On the other hand, when the controller 50 determines that the authentication is normal, the controller 50 advances the process to step S14.

In step S14, the controller 50 determines the display order and the display color corresponding to the user. In this process, the controller 50 refers to the registration job database JDB to determine the priority order so that a setting condition that corresponds to the authenticated user, and that has a high priority with the priority display flag being set is prioritized over a setting condition that corresponds to the authenticated user, and that has a low priority with the priority display flag not being set among the registered setting conditions. Further, when the user is authenticated, the controller 50 refers to the registration job database JDB to determine the priority order so that a setting condition corresponding to the authenticated user is prioritized over a setting condition not corresponding to the user among the registered setting conditions.

Further, the controller 50 refers to the user database UDB and reads the display order corresponding to the authenticated user (user ID). The controller 50 refers to the registration job database JDB to determine the priority order so that the setting condition that corresponds to the authenticated user, and in which the priority display flag is set is ranked according to the display order corresponding to the authenticated user. In addition, the controller 50 refers to the registration job database JDB to determine the priority order so that the setting condition that corresponds to the authenticated user, and in which the priority display flag is not set is ranked according to the display order corresponding to the authenticated user.

In particular, when the usage history is set as a display order corresponding to the authenticated user, the controller 50 refers to the registration job database JDB to determine the priority order so that a setting condition that the number of times the image is read is large is prioritized over a setting condition that the number of times the image is read is small. That is, the controller 50 determines the priority order so that a second specific setting condition that the number of times the image is read is large, compared with a first specific setting condition, is prioritized over the first specific setting condition among the registered setting conditions based on the usage history.

Further, the controller 50 reads the normal (standard) display order from the storage unit 61, refers to the registration job database JDB, and determines the priority order of the setting conditions that do not correspond to the authenticated user according to the normal display order. In the present embodiment, the normal priority is based on the chronological order of the registration date and time of the job icon (setting condition), but the priority is not limited to this. For example, the image reading apparatus 11 can change the normal priority order. In this way, when the user is authenticated, the controller 50 determines the display order corresponding to the authenticated user.

Further, the controller 50 refers to the user database UDB, reads the display color corresponding to the authenticated user (user ID), determines the read display color, and advances the process to step S15. Specifically, the controller 50 refers to the user database UDB, reads the display color corresponding to the authenticated user ID, and when a display color (such as blue) other than the normal display color (for example, white) is set, determines the display color. On the other hand, the controller 50 determines the normal display color when the normal display color is set. In this way, when the user is authenticated, the controller 50 determines the display color corresponding to the authenticated user. In the present embodiment, step S14 corresponds to an example of the determination step.

In step S15, the controller 50 determines whether a job registration operation is performed. In this process, the controller 50 determines whether the job registration operation is performed according to the input from the input unit 21 in a state where the user authentication is normally performed. When the controller 50 determines that the job registration operation is not performed, the controller 50 advances the process to step S18 without executing steps S16 and S17. On the other hand, when the controller 50 determines that the job registration operation is performed, the controller 50 advances the process to step S16.

In step S16, the controller 50 registers the job corresponding to the user. In this process, the controller 50 acquires the setting condition according to the input from the input unit 21, and registers the acquired setting condition in the registration job database JDB in association with the user ID of the authenticated user. That is, the controller 50 (registration unit 77) registers the setting condition in association with the user according to the input by the user. In particular, the controller 50 (registration unit 77) registers the setting condition in association with the priority represented by the priority display flag according to the input by the user. Further, in the present embodiment, the controller 50 (registration unit 77) registers the display color in association with the authenticated user by registering the display color corresponding to the setting condition according to the input by the user. In the embodiment, step S16 corresponds to an example of the registration step.

In step S17, the controller 50 performs the job display update process. In this process, as in step S14, the controller 50 determines the display order and the display color corresponding to the user including the registered setting conditions, and updates the display order of job icons (setting conditions) and the display color of the background image of the job icons. In the present embodiment, step S17 corresponds to an example of the determination step.

In step S18, the controller 50 determines whether there is a logout input according to the input from the input unit 21.

In this process, when the controller 50 determines that there is no logout input, the controller 50 advances the process to step S20 without executing step S19. On the other hand, when the controller 50 determines that there is the logout input, the controller 50 advances the process to step S19.

In step S19, the controller 50 reads the normal display order and display color stored in the storage unit 61 to determine the normal display order and display color. Further, in the present embodiment, when the power is turned on, the user is not authenticated, and the controller 50 determines the normal display order and display color as in step S19. That is, when the user is not authenticated, the controller 50 determines the normal display order and display color instead of the display order and display color corresponding to the user. In the present embodiment, step S19 corresponds to an example of the determination step.

In step S20, the controller 50 determines whether the job display condition is satisfied. In this process, the controller 50 determines that the job display condition is satisfied when an operation of displaying a plurality of job icons on the display unit 22 is performed according to the input from the input unit 21. When the controller 50 determines that the job display condition is not satisfied, the controller 50 advances the process to step S22 without executing step S21. On the other hand, when the controller 50 determines that the job display condition is satisfied, the controller 50 advances the process to step S21.

In step S21, the controller 50 displays the job display screen in the determined display order and display color. In this process, the controller 50 (display controller 79) refers to the priority order of the job icons determined in steps S14, S17, and S19, and displays the job icons on the display unit 22 based on the priority order. In particular, when the user is authenticated, the controller 50 (display controller 79) displays up to a predetermined number of job icons on the display unit 22 in descending order of the priority order determined in steps S14 and S17. Then, the controller 50 (display controller 79) slides the job icons left and right according to the input by the user such as a swipe operation to switch the job icons to be displayed.

Further, when the user is authenticated, the controller 50 (display controller 79) refers to the user database UDB, reads the display color corresponding to the authenticated user (user ID), and displays a background image 90G (see FIGS. 11, 16 and 18) on the display unit 22 in the display color. On the other hand, when the user is not authenticated, the controller 50 displays the background image 90G (see FIG. 7) on the display unit 22 in the normal display color. In the embodiment, step S21 corresponds to an example of a display control step.

Moreover, in the embodiment, the controller 50 displays various screens in the display area 23 of the display unit 22 according to the input by the user, and displays various images (for example, buttons, icons, tabs, and the like) in various display areas on various screens.

In step S22, the controller 50 determines whether a job selection operation is performed. In this process, the controller 50 determines that the job selection operation is performed when the job icon displayed on a main screen 80 is selected (touched) according to the input from the input unit 21. When the controller 50 determines that the job selection operation is not performed, the controller 50 ends the registration job control process without executing step S23. On the other hand, when the controller 50 determines that the job selection operation is performed, the controller 50 advances the process to step S23.

In step S23, the controller 50 performs the selected job and advances the process to step S24. In this process, the controller 50 reads the setting condition corresponding to the selected job icon, controls, based on the setting condition, the feed motor 37 and the transport motor 38 so as to transport the document D, and controls the reading unit 40 so that the image is read. That is, the controller 50 (reading controller 72) causes the reading unit 40 to read the image under the setting condition corresponding to the job icon selected according to the input by the user among the job icons displayed on the display unit 22. In the embodiment, step S23 corresponds to an example of a reading control step.

Then, in step S24, the controller 50 updates the usage history corresponding to the selected job icon in the registration job database JDB, and ends the registration job control process. In this way, the controller 50 stores the number of times the image is read as the usage history for each setting condition based on the selected job icon.

Figure 7:
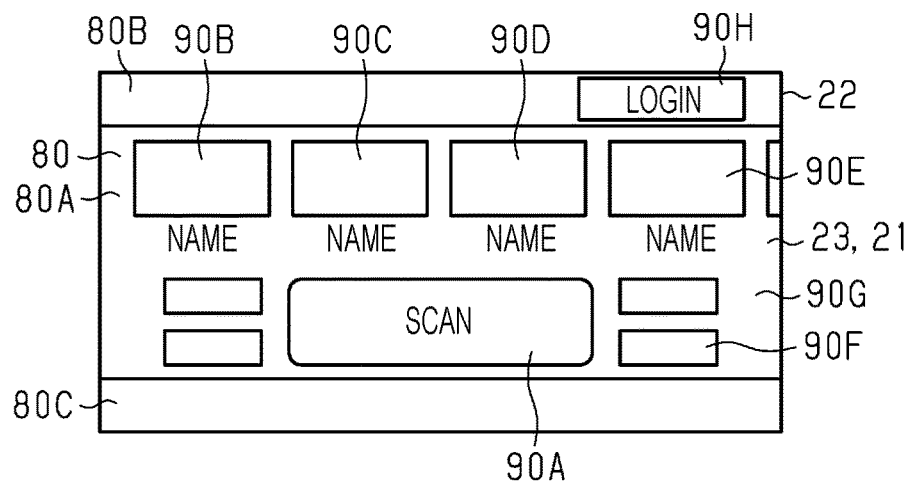
FIG. 7 is a schematic diagram showing a screen of an image display device.

Next, the operation of the image reading apparatus 11 will be described. As shown in FIG. 7, the main screen 80 is displayed in the display area 23 of the display unit 22. A main area 80A, which is an example of a predetermined display area, a header area 80B, and a footer area 80C are allocated as the main screen 80. The main screen 80 is a screen that a specific user does not log in but that is available to any user.

An image reading button 90A is displayed in the main area 80A. When the image reading button 90A is touched, the image is read under the setting condition currently set. Further, a plurality of job icons 90B to 90E is displayed in the main area 80A. When any of the plurality of job icons 90B to 90E is touched, the image is read under the setting condition corresponding to the touched job icon without the image reading button 90A being not touched.

When the display area 23 of the display unit 22 is swiped in the left-right direction, the job icons displayed in the main area 80A slides to display different job icons. In particular, when the display of the main screen 80 is started, the job icons having a higher priority order are displayed in order from the left side, and when the swipe operation is performed to the left, the job icons having a lower priority order can also be displayed.

To give a specific example, when the display of the main screen 80 is started, the job icon with the first ranked priority is displayed in the job icon 90B, and the job icons with the second to fourth ranked priority are displayed in the job icons 90C to 90E. Then, when the swipe operation is performed to the left, the plurality of job icons slides to the left, and the job icon with the first ranked priority slides to the left to be deleted. Further, the job icons with the second to fourth ranked priority are displayed in the job icons 90B to 90D, and the job icon with the fifth ranked priority is newly displayed in the job icons 90E. Further, since the user authentication is not performed at this time, the priority order of the job icons indicates the normal priority that does not correspond to the user.

Further, a favorite button 90F is displayed in the main area 80A. When the favorite button 90F is touched, the job icon (setting condition) can be registered and edited. Further, in the main area 80A, the white background image 90G is displayed as the background of various images such as the image reading button 90A, the plurality of job icons 90B to 90E, and the favorite button 90F. A login start button 90H is displayed in the header area 80B. When the login start button 90H is touched, a login screen 81 shown in FIG. 8 is displayed.

Figure 8:
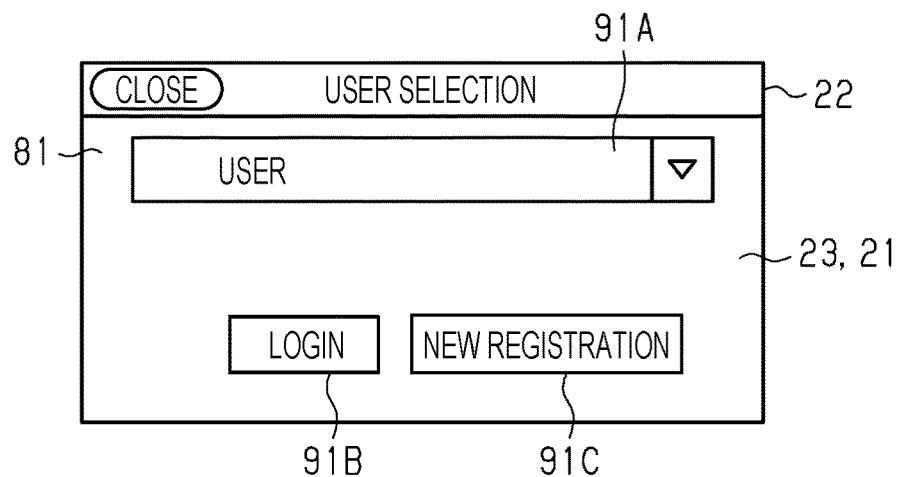
FIG. 8 is a schematic diagram showing a screen of the image display device.

As shown in FIG. 8, an input box 91A for inputting a user ID, a login button 91B, and a new registration button 91C are displayed on the login screen 81. When the input box 91A is touched, the user ID can be selected, and when the login button 91B is touched with the user ID selected, a password input screen 82 shown in FIG. 9 is displayed.

Figure 9:
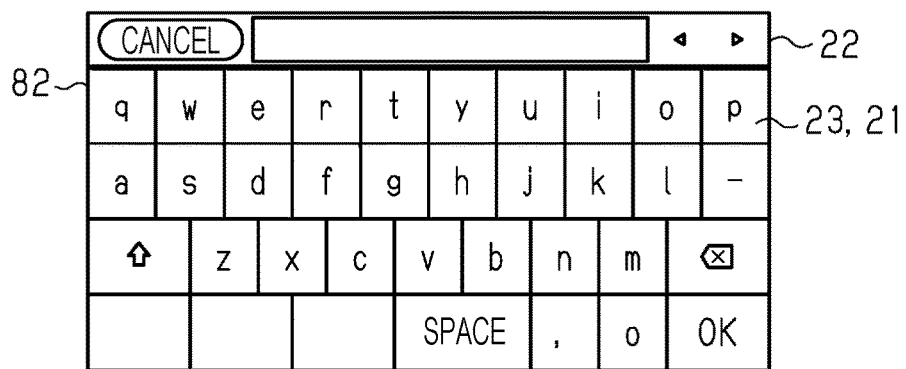
FIG. 9 is a schematic diagram showing a screen of the image display device.
Figure 10:
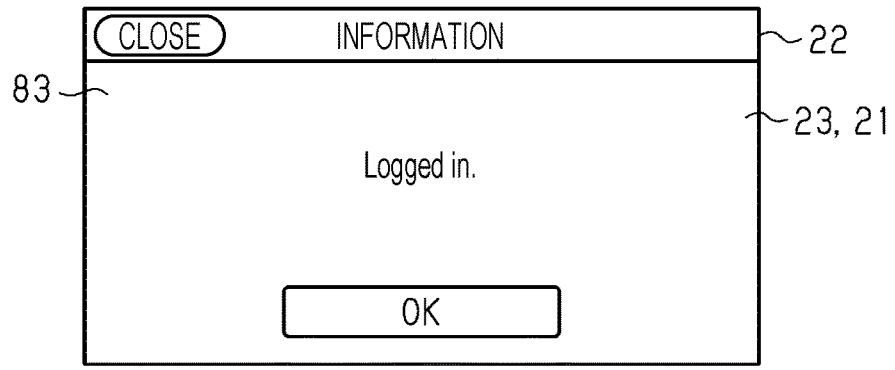
FIG. 10 is a schematic diagram showing a screen of the image display device.

As shown in FIG. 9, a plurality of input buttons is displayed on the password input screen 82, and the password can be input according to the input from the input buttons. When the password is input, the user is authenticated, and the login is normally performed, the login result screen 83 shown in FIG. 10 is displayed, and then the screen returns to the main screen 80.

Figure 11:
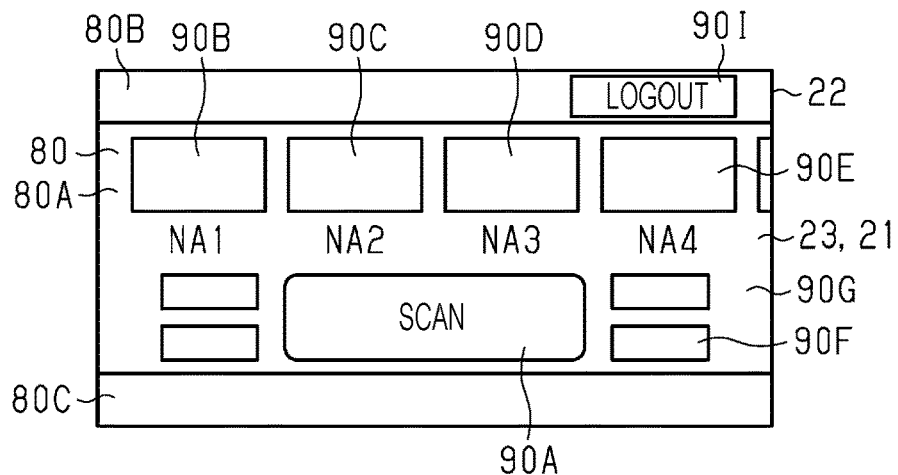
FIG. 11 is a schematic diagram showing a screen of the image display device.

As shown in FIG. 11, when the login is normally performed, the job icons 90B to 90E are displayed in the priority order corresponding to the authenticated user in the main area 80A of the main screen 80.

In the present embodiment, in the priority order of the job icons 90B to 90E, a job icon corresponding to the authenticated users has higher ranking than a job icon not corresponding to the authenticated user. Moreover, in the embodiment, in the priority order of the job icons 90B to 90E, a job icon in which the priority display flag is set has higher ranking than a job icon in which no priority display flag is set among the job icons corresponding to authenticated users.

Moreover, in the embodiment, in the priority order of the job icons 90B to 90E, the order is based on the display order set for each user in the job icons that correspond to the authenticated user and that have the priority display flag set. Moreover, in the embodiment, in the priority order of the job icons 90B to 90E, the order is based on the display order set for each user in the job icons that correspond to the authenticated user and in which no priority display flag is set. Further, in the present embodiment, in the priority order of the job icons 90B to 90E displayed, the order is based on the normal priority order in the job icons that do not correspond to the authenticated user.

Figure 12:
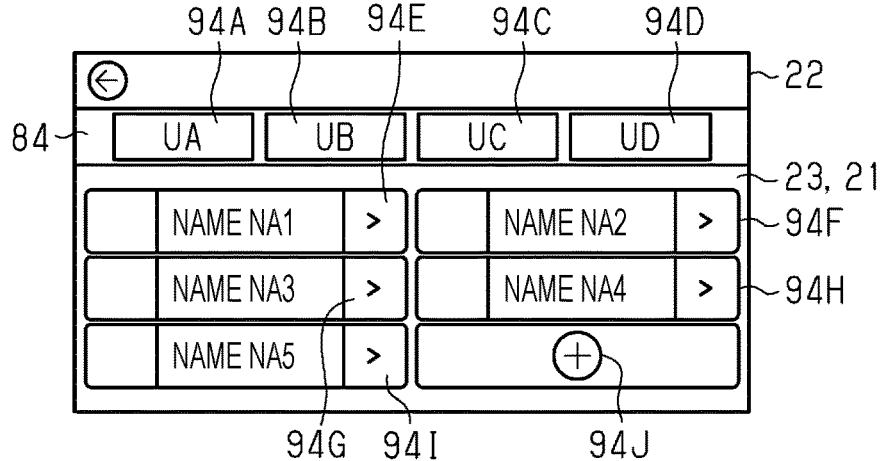
FIG. 12 is a schematic diagram showing a screen of the image display device.

When the favorite button 90F is touched, a job screen 84 shown in FIG. 12 is displayed. User tabs 94A to 94D, job edit buttons 94E to 94I, and a job registration button 94J are displayed on the job screen 84.

The user tabs 94A to 94D are displayed in the order of user registration, and when the screen is swiped left or right, the display of the user tab is switched. When any of the user tabs 94A to 94D is selected, the job edit buttons 94E to 94I and the job registration button 94J of the job icon (setting condition) corresponding to the selected user are displayed. In this case, five job icons corresponding to the user UA are registered, the respective job edit buttons 94E to 94I corresponding to the five job icons are displayed, and one job registration button 94J is displayed.

The job edit buttons 94E to 94I are buttons for editing the job icons (setting conditions) registered in advance. The job registration button 94J is a button for newly registering a job icon (setting condition). When the job registration button 94J is touched, a job registration screen 85 shown in FIG. 13 is displayed.

Figure 13:
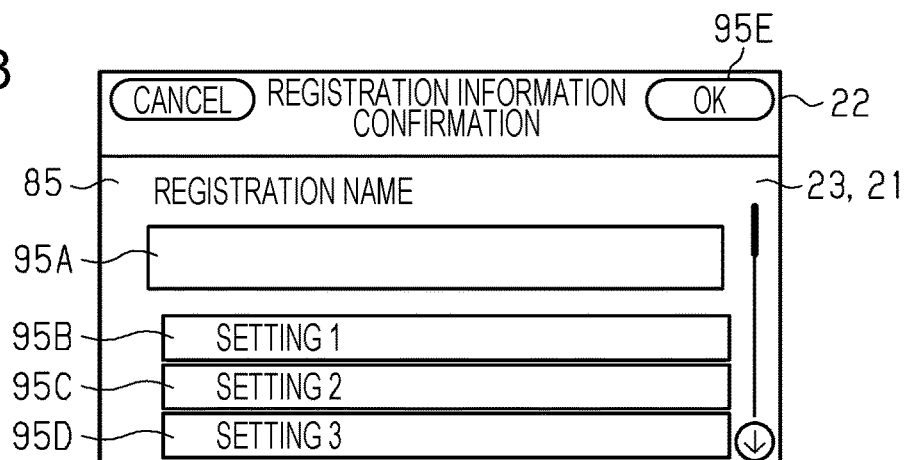
FIG. 13 is a schematic diagram showing a screen of the image display device.

As shown in FIG. 13, an image for newly registering the job contents of the job icon (setting condition) is displayed on the job registration screen 85. In the embodiment a job name registration box 95A for inputting the name of the job icon and a plurality of setting condition buttons 95B to 95D for specifying various job contents (setting conditions) to be registered are displayed on the job registration screen 85.

To give a specific example, the setting condition button 95B is set as a button to specify the document size, the setting condition button 95C is set as a button to specify the resolution, and the setting condition button 95D is set as a button to specify the reading color among the plurality of setting condition buttons 95B to 95D, but the present disclosure is not limited to this.

Figure 14:
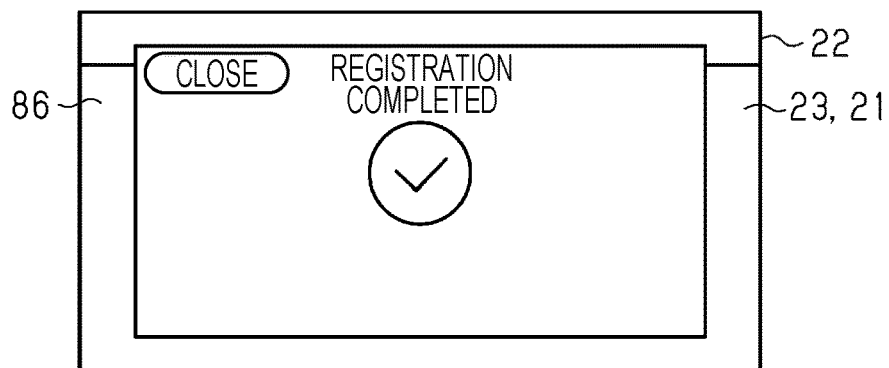
FIG. 14 is a schematic diagram showing a screen of the image display device.
Figure 15:
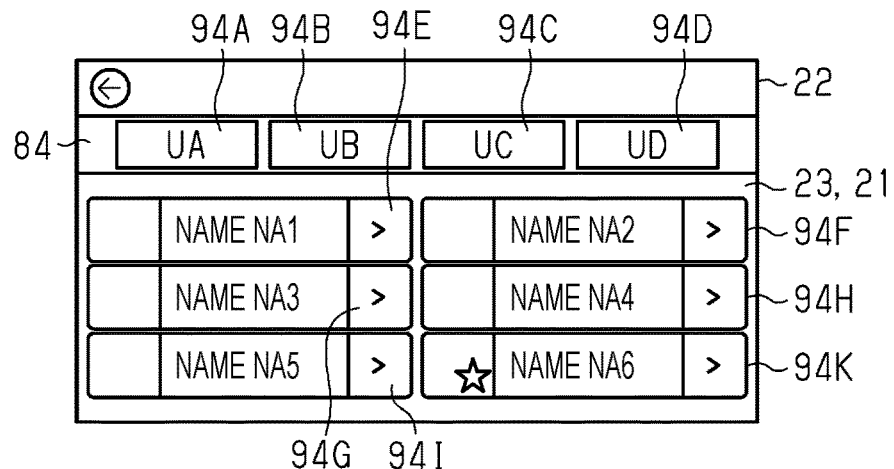
FIG. 15 is a schematic diagram showing a screen of the image display device.

When an OK button 95E is touched after the job contents of the job icon is set, a new job icon is registered and a registration confirmation screen 86 shown in FIG. 14 is displayed. Then, as shown in FIG. 15, a job edit button 94K corresponding to the registered job icon is displayed on the job screen 84. Also, in this case, for example, when the priority display flag is set to correspond to the registered job icon, an image indicating that the priority display flag is set (star image in the embodiment) is displayed so as to correspond to the job icon.

Figure 16:
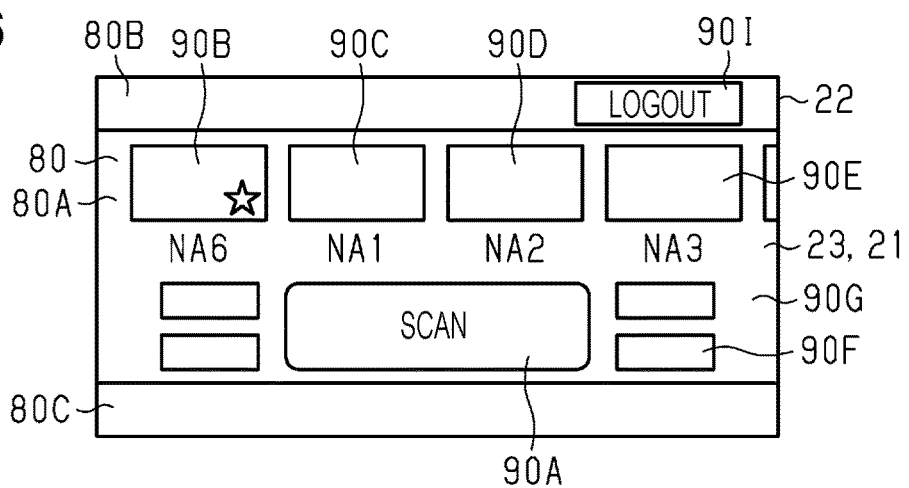
FIG. 16 is a schematic diagram showing a screen of the image display device.

As shown in FIG. 16, when the screen is returned the main screen 80, the job icons 90B to 90E are displayed in the priority order including the newly registered job icon. Further, for example, when the priority display flag is set so as to correspond to the registered job icon, the job icon with the priority display flag set is displayed as the job icon 90B having a high priority. In addition, an image indicating that the priority display flag is set (star image in the embodiment) is displayed so as to correspond to the job icon.

Figure 17:
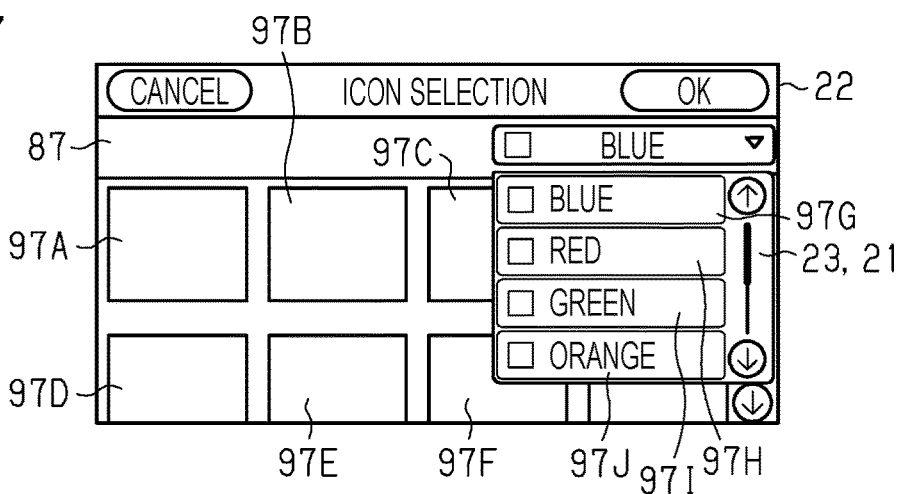
FIG. 17 is a schematic diagram showing a screen of the image display device.

Further, as shown in FIG. 17, when registering and editing a job icon, an icon selection screen 87 may be displayed according to the input by the user. A plurality of types of icon images 97A to 97F is displayed on the icon selection screen 87, and any of the plurality of types of icon images 97A to 97F can be registered as the icon image of the job icon.

Further, a plurality of types of display color images 97G to 97J is displayed on the icon selection screen 87, and any of the plurality of types of display color images 97G to 97J can be registered as the display color of the job icon. In the present embodiment, the display color registered to correspond to the job icon is registered as the display color corresponding to the user corresponding to the job icon. Therefore, for example, when blue is registered as the display color of the job icon corresponding to the user UA, the blue is registered as the display color corresponding to the user UA.

Figure 18:
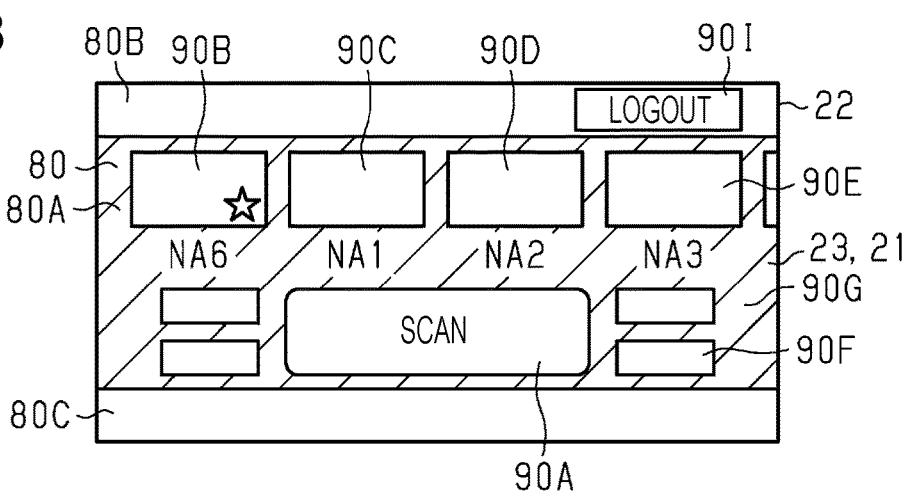
FIG. 18 is a schematic diagram showing a screen of the image display device.

As shown in FIG. 18, when the user is authenticated and the display color corresponding to the user is set, the background image 90G (hatched area in FIG. 18), which is an example of predetermined information, is displayed not in the normal display color (white) but in a display color (for example, blue) corresponding to the user in the main area 80A of the main screen 80.

As described in detail above, the following effects can be obtained according to the present embodiment.

(1) The setting condition related to reading of an image is registered in association with the user according to the input by the user. When the user is authenticated, the priority order is determined so that a setting condition corresponding to the authenticated user is prioritized over a setting condition not corresponding to the authenticated user among the registered setting conditions, and job icons indicating the setting conditions is displayed in the determined priority order. For this reason, the setting condition corresponding to the authenticated user can be displayed with priority, and it is possible to provide a situation where it is easy to select the setting condition corresponding to the user, so that it is possible to improve the convenience of the user to select any of the registered setting conditions.

(2) Further, the user can be identified by authenticating the user, and the user can be appropriately identified.

(3) The display unit 22 displays up to a predetermined number of (4 in the embodiment) job icons indicating setting conditions related to reading of an image in the display area 23 (main area 80A). When the user is authenticated, up to a predetermined number of job icons indicating the setting conditions are displayed in descending order of the priority order determined among the registered setting conditions, the job icon to be displayed is switched according to the input by the user. For this reason, even when there is an upper limit to the number of job icons that can be displayed, the job icons can be displayed in descending order of the priority order, and the job icon to be displayed according to the input by the user can be switched, so that it is possible to improve the convenience of the user to select any of the registered setting conditions.

(4) The setting conditions related to reading of an image are registered in association with the priority based on the priority display flag, and the priority order of the registered setting condition is determined based on the registered priority. For this reason, it is possible to determine the priority order of the registered setting conditions based on the priority represented by the priority display flag registered to correspond to the setting condition, and the setting conditions can be displayed with the priority according to the input by the user, so that it is possible to improve the convenience of the user to select any of the registered setting conditions.

(5) In particular, when a user is authenticated, the priority order is determined so that a setting condition having a high registered priority is prioritized over a setting condition having a low registered priority among the setting conditions corresponding to the authenticated user. Therefore, the setting condition can be registered in association with the priority among the setting conditions corresponding to the authenticated user. The priority order of the setting conditions corresponding to the user can be determined based on the priority, and the setting conditions can be displayed with the priority according to the input by the user, so that it is possible to improve the convenience of the user to select any of the registered setting conditions.

(6) The usage history in which the image is read is stored for each setting condition based on the job icon selected according to the input by the user, and the priority order is determined so that a setting condition (second specific setting condition) that the number of times the image is read is large is prioritized over a setting condition (first specific setting condition) that the number of times the image is read is small among the registered setting conditions based on the usage history. For this reason, it is possible to determine the priority order of the registered setting condition based on the usage history in which the image is read, and the job icons can be displayed in the priority order based on the usage history in which the image is read, so that it is possible to improve the convenience of the user to select any of the registered setting conditions.

(7) Further, in the related art, when setting conditions are registered by a plurality of users, it is difficult to recognize the authenticated user even when the user is authenticated. Therefore, it is desired to improve the convenience of the user to select any of the registered setting conditions. Therefore, the display color is registered in association with the user, and when the user is authenticated, the background image 90G is displayed in the display color corresponding to the authenticated user. Therefore, the identified user can be recognized from the display color in which the background image 90G is displayed, so that it is possible to improve the convenience of the user to select any of the registered setting conditions.

(8) When visually recognizing the background image 90G of the job icon as information to be displayed on the display unit 22, the authenticated user can be recognized from the display color, so that it is possible to improve the convenience of the user to select any of the registered setting conditions.

Second Embodiment

In the first embodiment, when the user is authenticated, the background image 90G is displayed in the display color corresponding to the user, but the present disclosure is not limited to this. For example, in the second embodiment, part or all of the display area of the job icon may be displayed in the display color corresponding to the user.

As a specific example, the outer frame of the job icons 90B to 90E shown in FIG. 18 may be displayed in the display color corresponding to the user. Further, the background image located in the background of each of the motif images of the job icons 90B to 90E may be displayed in the display color corresponding to the user. Specifically, when each of the job icons 90B to 90E is composed of a type image indicating the type (motif) of the job icon and a background image of the type image, the background image may be displayed in the display color corresponding to the user. That is, in the area of each of the job icons 90B to 90E, the background image of the type image indicating the type of the job icon may be displayed in the display color corresponding to the user. Further, for example, the type image may be displayed in the display color corresponding to the user. Further, additional image of the display color corresponding to the user may be displayed in each of the job icons 90B to 90E. Further, for example, a combination of these may be acceptable. That is, part or all of the area of each of the job icons 90B to 90E may be displayed in the display color corresponding to the user.

Further, for example, when the user is authenticated, the job icon corresponding to the authenticated user may be displayed in the display color corresponding to the user. In this case, the job icon that does not correspond to the authenticated user may be displayed in the display color corresponding to a user other than the authenticated user, or may be displayed in the normal display color. Further, for example, the job icon corresponding to the user may be displayed in the display color corresponding to the user regardless of whether the user is authenticated or the user is not authenticated. In this case, there is no problem even when the job icons are not displayed in the priority order corresponding to the authenticated user.

As described in detail above, the following effects can be obtained according to the present embodiment.

(9) In the related art, for example, when the number of setting conditions to be registered increases as the setting conditions are registered by a plurality of users, setting condition information other than the setting condition information indicating the setting conditions desired by the user is indicated although the desired information is displayed, so that it is necessary to find the setting condition information indicating the setting conditions desired by the user. Therefore, it is desired to improve the convenience of the user to select any of the registered setting conditions. Therefore, the display color is registered in association with the user, and part or all of the display area of the job icon corresponding to the user is displayed in the display color corresponding to the user. For this reason, the user can be recognized from the display color in which part or all of the display area of the job icon is displayed, so that it is possible to improve the convenience of the user to select any of the registered setting conditions.

(10) When visually recognizing the job icon as information to be displayed on the display unit 22, it is possible to recognize whether the job icon represents an authenticated user and a job icon corresponding to the authenticated user from the display color of the job icon, so that it is possible to improve the convenience of the user to select any of the registered setting conditions.

Third Embodiment

In the first and second embodiments, the priority order is determined based on the display order corresponding to the user in the user database UDB according to the input by the user, but the present disclosure is not limited to this. For example, in the third embodiment, regardless of the input by the user, as a result of detecting the size of document D, the priority order may be determined so that a setting condition corresponding to the detected document D size is prioritized over a setting condition not corresponding to the detected document D size.

In the third embodiment, the image reading apparatus 11 includes, on the document support 13 on which the document D is placed, a first detection sensor that detects whether the edge guide 13B is disposed at a predetermined position, and a second detection sensor that detects whether the auxiliary support portion 13C is disposed at a predetermined position. In the present embodiment, the first detection sensor and the second detection sensor correspond to an example of the document size detection unit that detects the size of the document D, but one or three or more sensors may be used. Further, for example, a sensor that detects the document D may be provided on the placement face 13A, and the size of the document D placed on the placement face 13A may be detected.

The controller 50 is coupled to the first detection sensor and the second detection sensor, and can receive a detection signal from the first detection sensor and a detection signal from the second detection sensor. Then, the controller 50 identifies the size of the document D placed on the placement face 13A of the document support 13 based on the detection signal from the first detection sensor and the detection signal from the second detection sensor.

Then, the controller 50 determines the priority order based on the size of the specified document D. To give a specific example, the setting conditions related to reading of an image include a setting condition (an example of the first setting condition) that the size of the document is a first size (for example, A4 size) and a setting condition (an example of the second setting condition) that the size of the document is a second size (for example, B5 size). When the size of the identified (detected) document D is the first size, the controller 50 (determination unit 78) determines the priority order so that a setting condition that the size of the document is the first size is prioritized over a setting condition that the size of the document D is the second size.

In this case, specifically, the controller 50 may determine the priority order so that a setting condition that the size of the identified document D matches is prioritized over a setting condition that the size of the identified document D does not match among the registered setting conditions (job icons). Then, the controller 50 may determine the priority order so that a setting condition corresponding to the authenticated user is prioritized over a setting condition not corresponding to the authenticated user among the setting conditions that the size of the identified document D matches. The controller 50 may determine the priority order so that a setting condition corresponding to the authenticated user is prioritized over a setting condition not corresponding to the authenticated user among the setting conditions that the size of the identified document D does not match.

Further, the controller 50 may determine the priority order so that a setting condition that the size of the identified document D matches is prioritized over a setting condition that the size of the identified document D does not match among the setting conditions corresponding to the authenticated user. Further, the controller 50 may determine the priority order so that a setting condition that the size of the identified document D matches is prioritized over a setting condition that the size of the identified document D does not match among the setting conditions not corresponding to the authenticated user.

In addition, the controller 50 may determine the priority order so that a setting condition that the size of the identified document D matches is prioritized over setting condition that the size of the identified document D does not match among the setting conditions that correspond to the authenticated user, and in which the priority display flag is set. In addition, the controller 50 may determine the priority order so that a setting condition that the size of the identified document D matches is prioritized over a setting condition that the size of the identified document D does not match among the setting conditions that correspond to the authenticated user, and in which no priority display flag is set.

As described in detail above, the following effects can be obtained according to the present embodiment.

(11) The setting conditions related to reading of an image include a setting condition (first setting condition) that the size of the document D is the first size (for example, A4 size) and a setting condition (second setting condition) that the size of the document D is the second size (for example, B5 size) is included. When the size of the identified document D is the first size based on the signals from the first detection sensor and the second detection sensor, the priority order is determined so that a setting condition that the size of the document D is the first size is prioritized over a setting condition that the size of the document D is the second size. For this reason, it is possible to determine the priority order of the registered setting condition based on the detected size of the document D, and the job icons can be displayed in the priority order based on the size of document D, so that it is possible to improve the convenience of the user to select any of the registered setting conditions.

The above embodiment can also be changed to a form such as the modification shown below. Further, a combination of the above embodiment and the modification examples shown below may be a further modification example, or a combination of the modification examples shown below may be a further modification example.

For example, when reading an image from a business card as the document D, a guide member that positions the width direction of the business card may be configured to be attached to the image reading apparatus 11 (document support 13). In this case, the image reading apparatus 11 may include a sensor that detects whether the guide member is attached, and the controller 50 may identify, based on the signal from the sensor, that the size of document D is a size of the business card, and may determine the priority order so that a setting condition that the size of the document D is the size of the business card is prioritized over a setting condition that the size of the document D is not the size of the business card. That is, the image reading apparatus 11 may include a sensor that detects whether the guide member that guides the document D is attached. The controller 50 (determination unit 78) may identify the size of the document D based on the detection result of whether the guide member is attached, and when the size of the specified (detected) document D is the first size, may determine the priority order so that a setting condition that the size of the document is the first size is prioritized over a setting condition that the size of the document D is the second size.

For example, when the user is authenticated, part or all of the header area 80B of the main screen 80 may be displayed in the display color corresponding to the user. Further, for example, when the user is authenticated, part or all of the footer area 80C of the main screen 80 may be displayed in the display color corresponding to the user. Further, for example, when the user is authenticated, images of various screens other than the main screen 80 may be displayed in the display color corresponding to the user. Further, for example, the screen may be at least any of a combination of the third embodiment, the first embodiment, and the second embodiment, a combination of the third embodiment and the first embodiment, and a combination of the third embodiment and the second embodiment. In other words, when the user is authenticated, at least any of a job icon, a background image of the job icon, a header image, and a footer image as information to be displayed on the display unit 22 (an example of predetermined information) may be displayed in the display color corresponding to the user. In this way, when visually recognizing at least any of the job icon, the background image of the job icon, the header image, and the footer image as information to be displayed on the display unit 22 the identified user can be recognized from the display color, so that it is possible to improve the convenience of the user to select any of the registered setting conditions.

For example, as the display order in the user database UDB, the setting condition may be searched for based on the input keyword, and the priority order may be determined based on the search result. As a specific example, the display order in the user database UDB can be based on a search for a keyword and can be associated with the keyword. In this case, when the user is authenticated, the controller 50 reads the display order corresponding to the authenticated user. When the read display order is based on a search for a keyword and the keyword, the controller 50 refers to the name of the setting condition in the registration job database JDB to determine the priority order so that a setting condition that match the keyword is prioritized over a setting condition that do not match the keyword. Further, when the read display order of the controller 50 is based on a search for a keyword and the keyword (for example, A4), the controller 50 may refer to the job contents of the setting condition in the registration job database JDB to determine the priority order so that a setting condition that matches the keyword may be prioritized over a setting condition that does not match the keyword. That is, the controller 50 may search for the setting condition based on a keyword as an example of the search information acquired according to the input by the user, and determine the priority order of the setting condition based on the search result. As a result, the setting condition can be displayed in the priority order based on the keyword according to the input by the user, so that it is possible to improve the convenience of the user to select any of the registered setting conditions.

The number of times the job icon is selected is stored as the usage history, but the present disclosure is not limited to this. For example, as a result of selecting the job icon, the number of documents D whose images have been read may be stored as the usage history. Further, the priority order may be determined based on the usage history in a predetermined period (for example, one month) defined retroactively to the current time.

The setting conditions may be any conditions related to reading of an image, and may include, for example, a date and time information condition, a human expression condition, a destination expression condition, a document type expression condition, a document source expression condition, and the like. The date and time information condition is a condition set as an important date and time, such as a birthday of the user, an anniversary, an anniversary of the company to which the user belongs, or a contract date. The human expression condition includes one person, a plurality of persons, a female, a male, a boy, a girl, and the like. The destination expression condition includes a folder, a cloud, a mail, a USB, and the like. The document type expression condition includes a single document, a plurality of documents, a business card, an envelope, a postcard, a card, a receipt, a photograph, a voucher, a driver's license, a check, and the like. The document source expression condition includes a school, a hospital, a medicine (a pharmacy), and a company.

For example, the display order may not be associated with the user, and the normal display order may be applied instead of the display order corresponding to the user. For example, the priority display flag may not be associated with the job icon (setting condition), and in this case, the priority order based on the priority display flag may not be determined.

For example, the main screen 80 displayed in the display area 23 of the display unit 22 may not include at least any of the header area 80B and the footer area 80C. That is, the predetermined display area in which the job icon is displayed may be part or all of the display area 23 of the display unit 22.

It is not necessary to perform display switching so that one job icon is erased and one job icon is displayed, but display switching may be performed so that all the predetermined number of job icons are erased and the predetermined number of other job icons are display. Further, for example, both of these may be performed according to different operations. Further, various pieces of input (input operations) may be performed by, for example, a simple touch operation instead of the swipe operation.

The image may be read by touching the job icon without touching the image reading button 90A, or the image may be read by touching the image reading button 90A after the job icon is touched.

One user ID is associated with one registered setting condition, but the present disclosure is not limited to this, and for example, a plurality of user IDs may be associated with one registered setting condition.

When the setting condition is registered in association with the user according to the input by the user, the user who performed input and the user associated with the setting condition may be the same or different. That is, the user who performs input and the user associated with the setting condition may be the same or different.

Even when the user is not authenticated, the user who uses the image reading apparatus 11 may be identified.

The input unit 21 is not limited to the touch panel, but may be, for example, an operation button.

The position where the document presence/absence sensor 46 is disposed may be a position where the presence/absence of the document D and the front and rear ends of the document D can be detected before the document D is discharged.

The power sources of the transport unit 31 and the discharge unit 32 is not limited to be common, but the transport unit 31 and the discharge unit 32 may be driven by respective power sources. For example, the power source of the transport unit 31 is a transport motor, and the power source of the discharge unit 32 is a discharge motor.

The image sensor is not limited to be a CMOS image sensor, but, for example, may be a metal oxide semiconductor (MOS) image sensor or a charge coupled device (CCD) image sensor.

The image sensor 42 is not limited to a linear image sensor, but may be an area image sensor.

Respective functional components in the computer 60 are not limited to being implemented by the CPU, but, for example, may be implemented by hardware by an electronic circuit such as an application specific integrated circuit (ASIC) and a field-programmable gate array (FPGA), or may be implemented by both software and hardware.

The material of the document is not limited to paper, but may be a resin film, a sheet, a woven fabric, a metal film, or the like.

The image reading apparatus may be part of a multifunction machine having a print function and a copying function in addition to the scanner function.

The image reading apparatus is not limited to be of a sheet feed type, but may be of a flatbed type. When it is a flatbed type image reading apparatus, the image reading apparatus includes, in the main body, a carriage that can move along the sub scanning direction (X direction). The carriage is moved powered by a scanning motor, and reads the image of the document set on the glass plate of the document tray with the light source and reading unit provided on the carriage. The above embodiment can be applied to even this type of flatbed type image reading apparatus as long as it is provided with an automatic document feeder (auto sheet feeder) that automatically feeds documents. Further, the above embodiment can be applied not only to the image reading apparatus but also to the image reading control method and program in the image reading apparatus.

Hereinafter, the technical idea grasped from the above-described embodiment and modification will be described together with the effects. The image reading apparatus includes a reading unit that reads an image from a document, a controller that controls the reading unit, and a display unit that displays information about the image reading by the reading unit, wherein the controller includes a registration unit that registers, according to input by a user, a setting condition related to the image reading by the reading unit in association with the user, an identification unit that identifies a user, a determination unit that determines a priority order so that a setting condition corresponding to the user is prioritized over a setting condition not corresponding to the user among setting conditions registered by the registration unit when a user is identified by the identification unit, a display controller that displays, on the display unit, setting condition information indicating the setting conditions in the priority order determined by the determination unit, and a reading controller that causes the reading unit to read an image under a setting condition based on setting condition information selected according to input by a user of the setting condition information indicating the setting conditions displayed on the display unit.

According to this configuration, the setting condition related to reading of an image is registered in association with the user according to the input by the user. When the user is identified, the priority order is determined so that a setting condition corresponding to the identified user is prioritized over a setting condition not corresponding to the user among the registered setting conditions, and the setting condition information indicating the setting conditions in the determined priority is displayed. For this reason, the setting conditions corresponding to the user can be displayed with priority, and it is possible to provide a situation where it is easy to select the setting condition corresponding to the user, so that it is possible to improve the convenience of the user to select any of the registered setting conditions.

In the image reading apparatus, the identification unit may be an authentication unit that authenticates a user. According to this configuration, the user can be identified by authenticating the user, and the user can be identified accurately.

In the above image reading apparatus, the display unit may display, in a predetermined display area, up to a predetermined number of pieces of setting condition information indicating setting conditions related to the image reading by the reading unit, and wherein when a user is identified by the identification unit, the display controller may display up to the predetermined number of pieces of setting condition information indicating the setting conditions in descending order of the priority order determined by the determination unit among the setting conditions registered by the registration unit to switch setting condition information displayed according to input by the user.

According to this configuration, the display unit displays, in a predetermined display area, up to a predetermined number of pieces of setting condition information indicating setting conditions related to reading of an image, up to a predetermined number of pieces of setting condition information indicating the setting conditions are displayed in descending order of the determined priority order among the registered setting conditions when the user is identified, and the setting condition information to be displayed is switched according to the input by the user. For this reason, even when there is an upper limit to the number of setting condition information to be displayed, the setting condition information is displayed in descending order of the priority order, the setting condition information to be displayed can be switched according to the input by the user, so that it is possible to improve the convenience of the user to select any of the registered setting conditions.

In the above image reading apparatus, the registration unit may register the setting conditions related to the image reading by the reading unit in association with priority, and wherein the determination unit may determine a priority order of the setting condition registered by the registration unit based on the priority registered by the registration unit.

According to this configuration, the setting conditions related to reading of an image are registered in association with priority, and the priority order of the registered setting conditions is determined based on the registered priority. For this reason, it is possible to determine the priority order of the registered setting conditions based on the priority registered to correspond to the setting condition, and the setting conditions can be displayed with the priority according to the input by the user, so that it is possible to improve the convenience of the user to select any of the registered setting conditions.

In the above image reading apparatus, when a user is identified by the identification unit, the determination unit may determine a priority order so that a setting condition that is registered by the registration unit, and that has a high priority is prioritized over a setting condition that is registered by the registration unit, and that has a low priority among setting conditions corresponding to the user.

According to this configuration, when the user is identified, the priority order is determined so that a setting condition having a high registered priority is prioritized over a setting condition having a low registered priority among the setting conditions corresponding to the identified user. Therefore, it is possible to determine the priority order of the setting condition corresponding to the user based on the priority by registering the setting condition in association with the priority among the setting conditions corresponding to the identified user. Therefore, the setting conditions can be displayed with the priority according to the input by the user, so that it is possible to improve the convenience of the user to select any of the registered setting conditions.

In the above image reading apparatus, the determination unit may search, based on search information acquired according to input by a user, for a setting condition registered by the registration unit to determine, based on a search result, a priority order of the setting condition registered by the registration unit.

According to this configuration, the registered setting condition is searched for based on the search information acquired according to the input by the user, and the priority order of the registered setting condition is determined based on the search result. Therefore, the registered setting condition is searched for based on the search information acquired according to the input by the user, and the priority order of the registered setting condition can be determined based on the search result. Therefore, the setting conditions can be displayed in the priority order based on the search information according to the input by the user, so that it is possible to improve the convenience of the user to select any of the registered setting conditions.

The above image reading apparatus may further include a document size detection unit that detects a size of a document, wherein the setting conditions related to the image reading by the reading unit may include a first setting condition that the size of the document is a first size and a second setting condition that the size of the document is a second size, and wherein when the size of the document detected by the document size detection unit is the first size, the determination unit may determine a priority order so that the first setting condition is prioritized over the second setting condition.

According to this configuration, the setting conditions related to reading of an image include the first setting condition that the size of the document is the first size, and the second setting condition that the size of the document is the second size, and when the detected document size is the first size, the priority order is determined so that the first setting condition is prioritized over the second setting condition. For this reason, it is possible to determine the priority order of the registered setting condition based on the detected size of the document D, and the setting condition information can be displayed in the priority order based on the size of the document D, so that it is possible to improve the convenience of the user to select any of the registered setting conditions.

In the above image reading apparatus, the controller may store history information in which an image is read by the reading controller for each setting condition based on setting condition information selected according to input by a user, and wherein the determination unit may determine, based on the history information, a priority order so that a second specific setting condition that the number of times an image is read is large, compared with a first specific setting condition, is prioritized over the first specific setting condition among setting conditions registered by the registration unit.

According to this configuration, the history information in which the image is read for each setting condition based on the setting condition information selected according to the input by the user is stored, and the priority order is determined so that the second specific setting condition that the number of times the image is read is large, compared with the first specific setting condition, is prioritized over the first specific setting condition among the registered setting conditions based on the history information. For this reason, it is possible to determine the priority order of the registered setting condition based on the history information in which the image is read, and the setting condition information can be displayed in the priority order based on the history information in which the image is read, so that it is possible to improve the convenience of the user to select any of the registered setting conditions.

In the above image reading apparatus, the registration unit may register a display color in association with a user, and wherein when a user is identified by the identification unit, the display controller may display predetermined information on the display unit in a display color corresponding to the user.

According to this configuration, the display color is registered in association with the user, and when the user is identified, the predetermined information is displayed in the display color corresponding to the identified user. Therefore, the identified user can be recognized from the display color in which the predetermined information is displayed, so that it is possible to improve the convenience of the user to select any of the registered setting conditions.

In the above image reading apparatus, the predetermined information may be, as information to be displayed on the display unit, at least any of the setting condition information indicating the setting conditions registered by the registration unit, the background image of the setting condition information, the header image, and the footer image.

According to this configuration, when visually recognizing at least any of the setting condition information, the background image of the setting condition information, the header image, and the footer image as information to be displayed on the display unit, the identified user can be recognized from the display color, so that it is possible to improve the convenience of the user to select any of the registered setting conditions.

The image reading control method includes a registration step of registering, according to input by a user, a setting condition related to reading of an image from a document in association with the user, an identification step of identifying a user, a determination step of determining a priority order so that when a user is identified in the identification step, a setting condition corresponding to the user is prioritized over a setting condition not corresponding to the user among setting conditions registered in the registration step, a display control step of displaying, on the display unit, setting condition information indicating the setting conditions in the priority order determined in the determination step, and a reading control step of causing the reading unit to read an image under a setting condition based on setting condition information selected according to input by a user of the setting condition information indicating the setting conditions displayed in the display control step. According to this method, the effects same as that of the image reading apparatus can be obtained.

The non-transitory computer-readable storage medium storing a program causes a computer to execute a method. The method includes a registration step of registering, according to input by a user, a setting condition related to reading of an image from a document in association with the use, an identification step of identifying a user, a determination step of determining a priority order so that when a user is identified in the identification step, a setting conditions corresponding to the user is prioritized over a setting condition not corresponding to the user among setting conditions registered in the registration step, a display control step of displaying, on the display unit, setting condition information indicating the setting conditions in the priority order determined in the determination step, and a reading control step of causing the reading unit to read an image under a setting condition based on setting condition information selected according to input by a user of the setting condition information indicating the setting conditions displayed in the display control step. According to this program, the effects same as that of the image reading apparatus can be obtained.

What is claimed is:

1. An image reading apparatus comprising:
    a reading unit configured to scan an image from a document;
    a controller configured to control the reading unit; and
    a display unit configured to display information about the image reading performed by the reading unit, wherein the controller includes
        a registration unit configured to register user-specific scan settings related to the image scanning performed by the reading unit,
        an identification unit configured to identify a user,
        a determination unit configured to determine a priority order so that when a user is identified by the identification unit, user-specific scan settings corresponding to the identified user are prioritized over user-specific scan settings not corresponding to the identified user among user-specific scan settings registered by the registration unit,
        a display controller configured to display, on the display unit, user-specific scan settings information indicating the user-specific scan settings in the priority order determined by the determination unit, and
        a reading controller configured to cause the reading unit to scan an image under user-specific scan settings based on the displayed user-specific scan settings information selected according to input by a user,
    the display unit is configured to display, in a predetermined display area, up to a predetermined number of pieces of user-specific scan settings information indicating user-specific scan settings related to the image reading performed by the reading unit, and wherein
    when a user is identified by the identification unit, the display controller displays up to the predetermined number of pieces of user-specific scan settings information indicating user-specific scan settings in descending order of the priority order determined by the determination unit among the user-specific scan settings registered by the registration unit to switch user-specific scan settings information displayed according to input by a user.

2. The image reading apparatus according to claim 1, wherein the identification unit is an authentication unit configured to authenticate a user.

3. The image reading apparatus according to claim 1, wherein
    the registration unit is configured to register the user-specific scan settings related to the image reading performed by the reading unit in association with priority, and wherein
    the determination unit is configured to determine a priority order of the user-specific scan settings registered by the registration unit based on the priority registered by the registration unit.

4. The image reading apparatus according to claim 3, wherein when a user is identified by the identification unit, the determination unit determines a priority order so that a user-specific scan settings that is registered by the registration unit, and that has a high priority is prioritized over a user-specific scan settings that is registered by the registration unit, and that has a low priority among user-specific scan settings corresponding to the user.

5. The image reading apparatus according to claim 1, wherein the determination unit searches, based on search information acquired according to input by a user, for a user-specific scan settings registered by the registration unit to determine, based on a search result, a priority order of the user-specific scan settings registered by the registration unit.

6. The image reading apparatus according to claim 1, wherein
    the controller stores history information in which an image is read by the reading controller for each user-specific scan settings based on user-specific scan settings information selected according to input by a user, and wherein
    the determination unit determines, based on the history information, a priority order so that a second specific user-specific scan setting that the number of times an image is read is large, compared with a first specific user-specific scan setting, is prioritized over the first specific user-specific scan setting among setting conditions registered by the registration unit.

7. An image reading apparatus comprising:
    a reading unit configured to scan an image from a document;
    a controller configured to control the reading unit;
    a document size detection unit that detects a size of a document, and
    a display unit configured to display information about the image reading performed by the reading unit, wherein the controller includes
        a registration unit configured to register user-specific scan settings related to the image scanning performed by the reading unit,
        an identification unit configured to identify a user,
        a determination unit configured to determine a priority order so that when a user is identified by the identification unit, user-specific scan settings corresponding to the identified user are prioritized over user-specific scan settings not corresponding to the identified user among user-specific scan settings registered by the registration unit, a display controller configured to display, on the display unit, user-specific scan settings information indicating the user-specific scan settings in the priority order determined by the determination unit, and a reading controller configured to cause the reading unit to scan an image under user-specific scan settings based on the displayed user-specific scan settings information selected according to input by a user, the user-specific scan settings related to the image reading performed by the reading unit include a first user-specific scan setting that the size of the document is a first size and a second user-specific scan setting that the size of the document is a second size, and wherein when the size of the document detected by the document size detection unit is the first size, the determination unit determines a priority order so that the first user-specific scan setting is prioritized over the second user-specific scan setting.

8. An image reading apparatus comprising:
a reading unit configured to scan an image from a document;
a controller configured to control the reading unit; and
a display unit configured to display information about the image reading performed by the reading unit, wherein the controller includes
  a registration unit configured to register user-specific scan settings related to the image scanning performed by the reading unit,
  an identification unit configured to identify a user,
  a determination unit configured to determine a priority order so that when a user is identified by the identification unit, user-specific scan settings corresponding to the identified user are prioritized over user-specific scan settings not corresponding to the identified user among user-specific scan settings registered by the registration unit,
  a display controller configured to display, on the display unit, user-specific scan settings information indicating the user-specific scan settings in the priority order determined by the determination unit, and
  a reading controller configured to cause the reading unit to scan an image under user-specific scan settings based on the displayed user-specific scan settings information selected according to input by a user,
the registration unit registers a display color in association with a user, and wherein
when a user is identified by the identification unit, the display controller displays predetermined information on the display unit in a display color corresponding to the identified user.

9. The image reading apparatus according to claim 8, wherein the predetermined information is, as information to be displayed on the display unit, at least any of user-specific scan settings information indicating user-specific scan settings registered by the registration unit, a background image of the user-specific scan settings information, a header image, and a footer image.

10. An image reading control method comprising:
a registration step of registering, according to input by a user, user-specific scan settings related to reading of an image from a document in association with the user;
an identification step of identifying a user;
a determination step of determining a priority order so that when a user is identified in the identification step, user-specific scan settings corresponding to the identified user are prioritized over user-specific scan settings not corresponding to the identified user among user-specific scan settings registered in the registration step;
a display control step of displaying, on a display unit and in a predetermined area, up to a predetermined number of pieces of user-specific scan settings information indicating the user-specific scan settings in the priority order determined in the determination step, wherein when a user is identified in the identification step, the display unit displays up to the predetermined number of pieces of user-specific scan settings information indicating user-specific scan settings in descending order of the priority order determined in the determination step among the user-specific scan settings registered in the registration step to switch user-specific scan settings information displayed according to input by a user; and
a reading control step of causing the reading unit to read an image under user-specific scan settings based on the displayed user-specific scan settings information selected according to input by a user.

11. A non-transitory computer-readable storage medium storing a program causing a computer to execute a method, the method comprising:
a registration step of registering, according to input by a user, user-specific scan settings related to reading of an image from a document in association with the user;
an identification step of identifying a user;
a determination step of determining a priority order so that when a user is identified in the identification step, user-specific scan settings corresponding to the identified user are prioritized over user-specific scan settings not corresponding to the identified user among user-specific scan settings registered in the registration step;
a display control step of displaying, on a display unit and in a predetermined area, up to a predetermined number of pieces of user-specific scan settings information indicating the user-specific scan settings in the priority order determined in the determination step, wherein when a user is identified in the identification step, the display unit displays up to the predetermined number of pieces of user-specific scan settings information indicating user-specific scan settings in descending order of the priority order determined in the determination step among the user-specific scan settings registered in the registration step to switch user-specific scan settings information displayed according to input by a user; and
a reading control step of causing the reading unit to read an image under user-specific scan settings based on the displayed user-specific scan settings information selected according to input by a user.

* * * * *